(12) United States Patent
Iwaizono et al.

(10) Patent No.: US 6,524,732 B1
(45) Date of Patent: Feb. 25, 2003

(54) RECHARGEABLE BATTERY WITH PROTECTIVE CIRCUIT

(75) Inventors: Yoshinori Iwaizono, Okayama (JP); Shoji Konishi, Kyoto (JP); Shigeru Kajiwara, Hirakata (JP); Takeshi Ishimaru, Moriguchi (JP); Masaru Kawabe, Suita (JP); Katsuyuki Shirasawa, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/701,667

(22) PCT Filed: Mar. 29, 2000

(86) PCT No.: PCT/JP00/01982

§ 371 (c)(1),
(2), (4) Date: Nov. 30, 2000

(87) PCT Pub. No.: WO00/59064

PCT Pub. Date: Oct. 5, 2000

(30) Foreign Application Priority Data

| Mar. 30, 1999 | (JP) | 11-088502 |
| Jul. 23, 1999 | (JP) | 11-209475 |
| Jan. 7, 2000 | (JP) | 2000-005851 |
| Mar. 3, 2000 | (JP) | 2000-059166 |

(51) Int. Cl.[7] .................................. H01M 14/00
(52) U.S. Cl. .................... 429/7; 429/122; 429/129; 429/96; 429/100
(58) Field of Search .................. 429/7, 122, 129, 429/96, 100

(56) References Cited

U.S. PATENT DOCUMENTS

| 5,818,198 A | 10/1998 | Mito et al. | |
| 6,117,576 A | * 9/2000 | Sugai | 429/7 |
| 6,432,575 B1 | * 8/2002 | Yamagami | 429/100 |

FOREIGN PATENT DOCUMENTS

| JP | 9-139235 | 5/1997 |
| JP | 10-275612 | 10/1998 |

* cited by examiner

*Primary Examiner*—Patrick Ryan
*Assistant Examiner*—Angela J Martin
(74) *Attorney, Agent, or Firm*—Jordan and Hamburg LLP

(57) ABSTRACT

A rechargeable battery is integrated with a battery protection circuit that protects the rechargeable battery from overcharging, overdischarging, and so forth. A circuit board (9) on which are formed a battery protection circuit, a positive input and output terminal (4), and a temperature detection terminal (6) is disposed on a rechargeable battery (10) via a spacer (13), and the positive and negative electrodes of the rechargeable battery (10) are connected to the circuit board (9). This assembly is enveloped by a cover cap (15) and a cover plate (14), such that the positive input and output terminal (4) and the temperature detection terminal (6) are exposed to the outside through openings provided in the cover plate (14), and one end of the cover cap (15) in the same plane as these is used for connection as a negative input and output terminal (5).

6 Claims, 33 Drawing Sheets

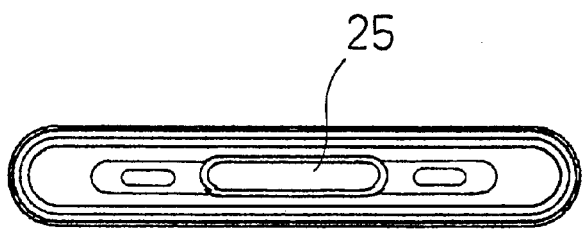
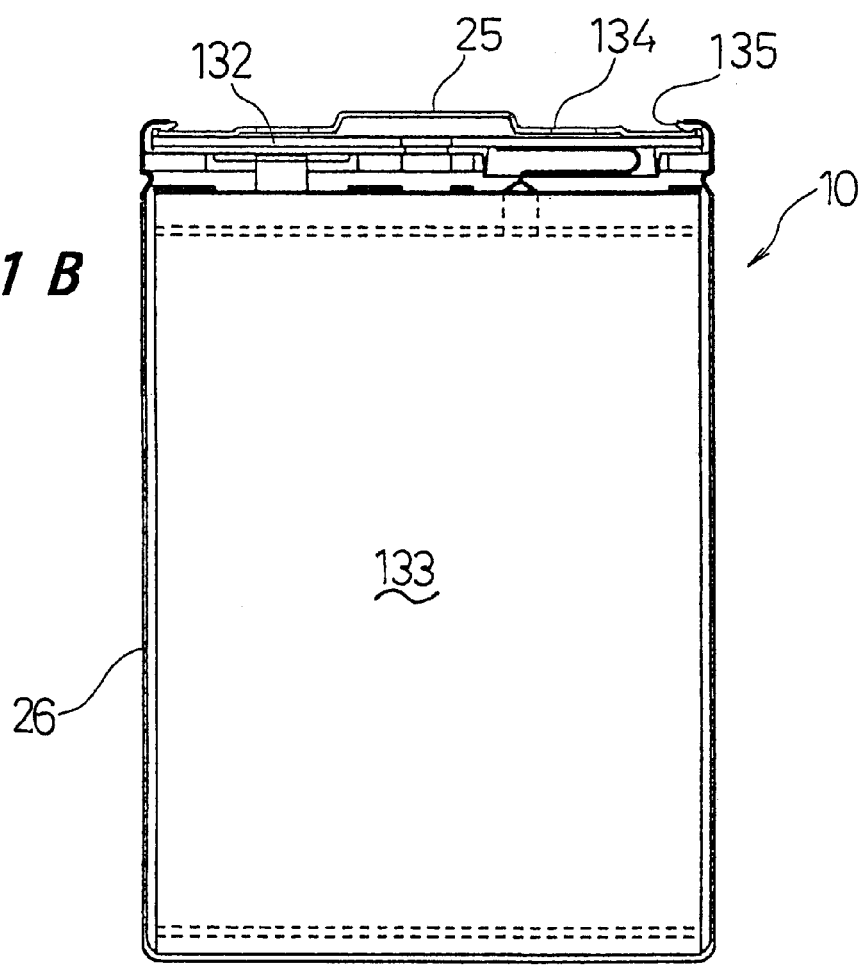

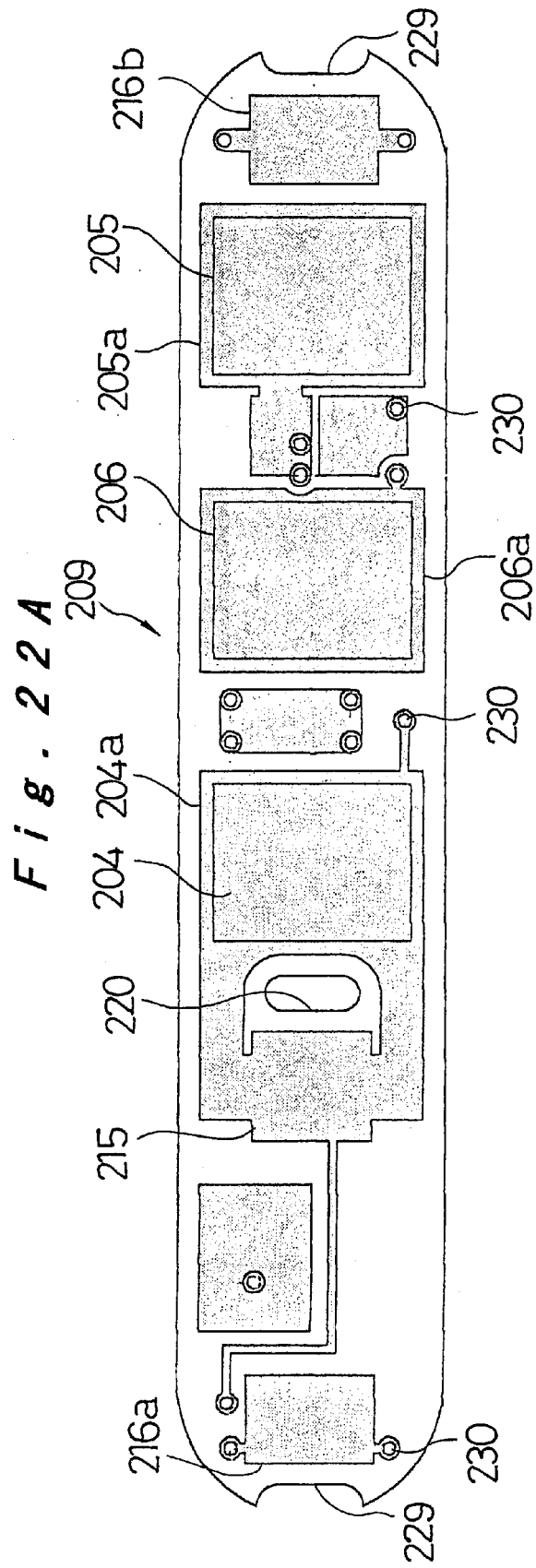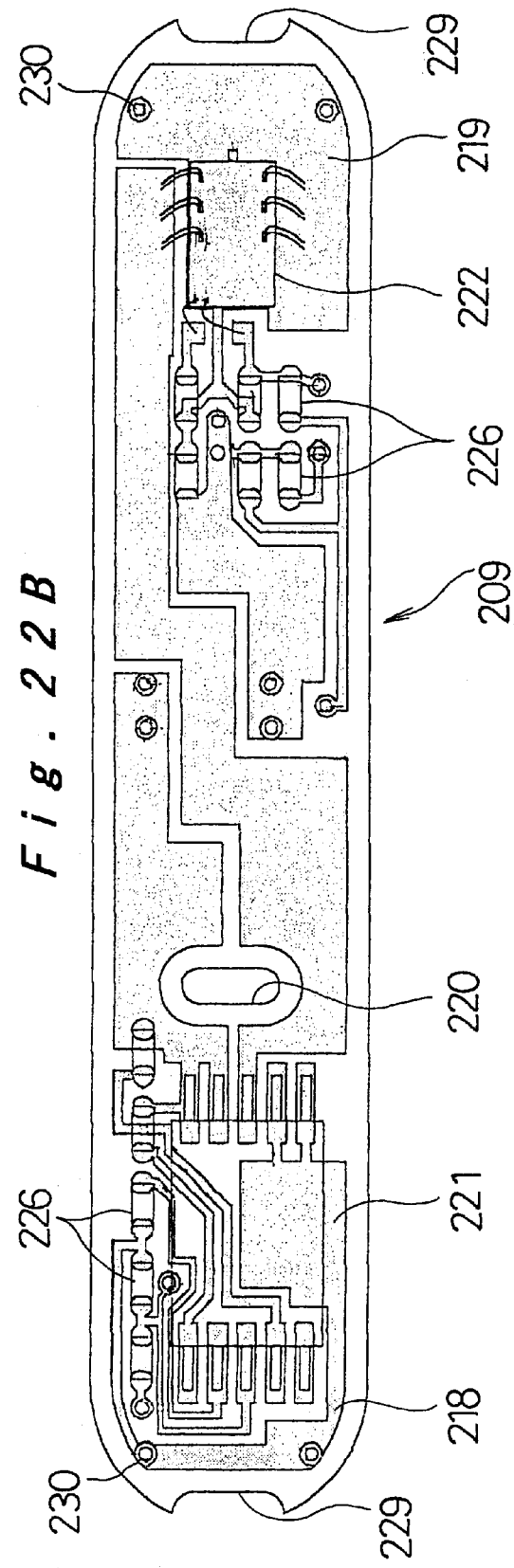

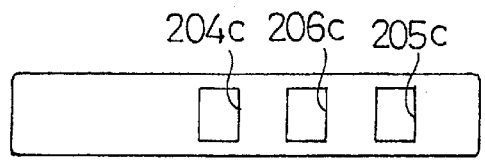
Fig. 24A
Fig. 24C  Fig. 24B  Fig. 24D
 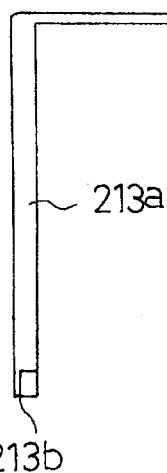 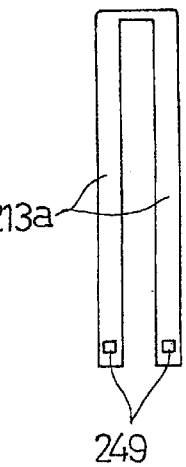
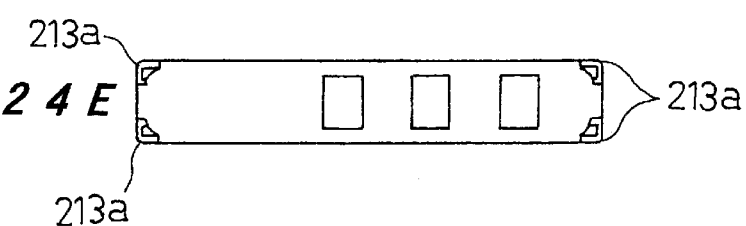
Fig. 24E Fig. 25A
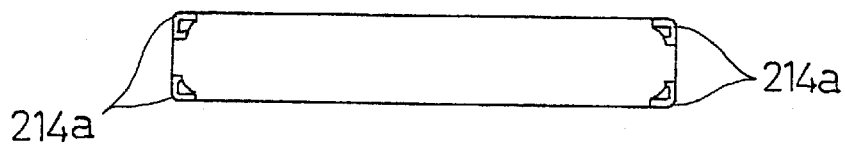
Fig. 25C  Fig. 25B  Fig. 25D
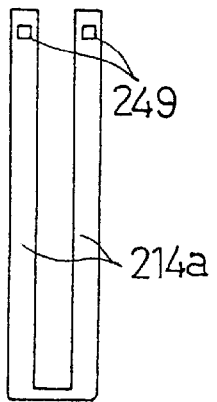 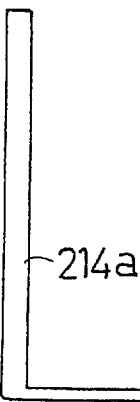 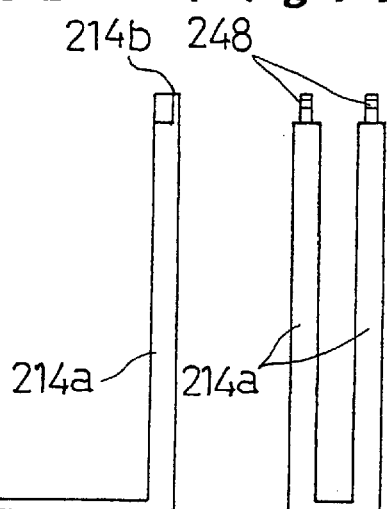
Fig. 25E

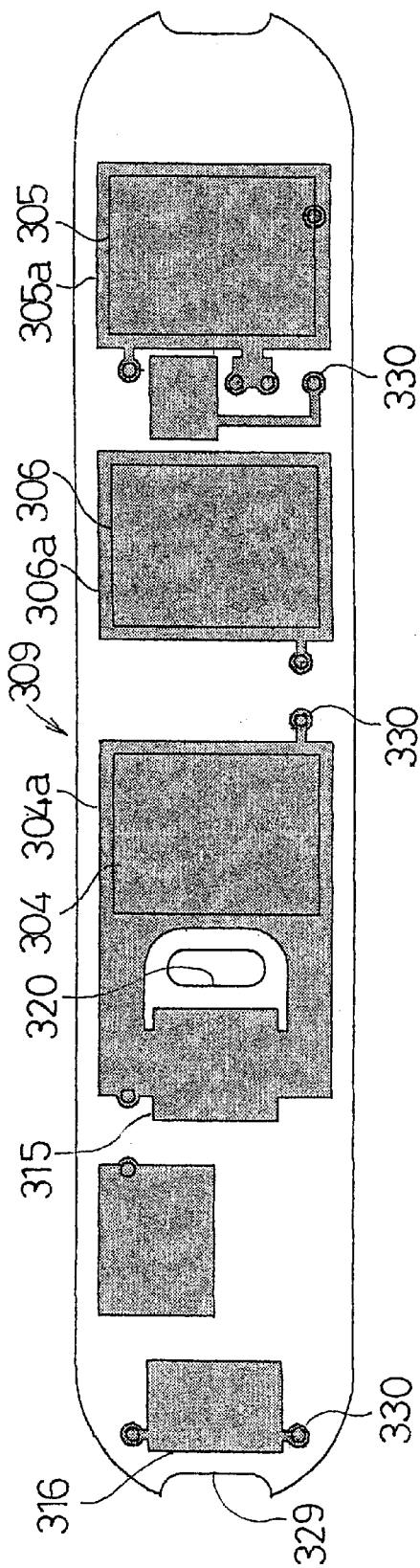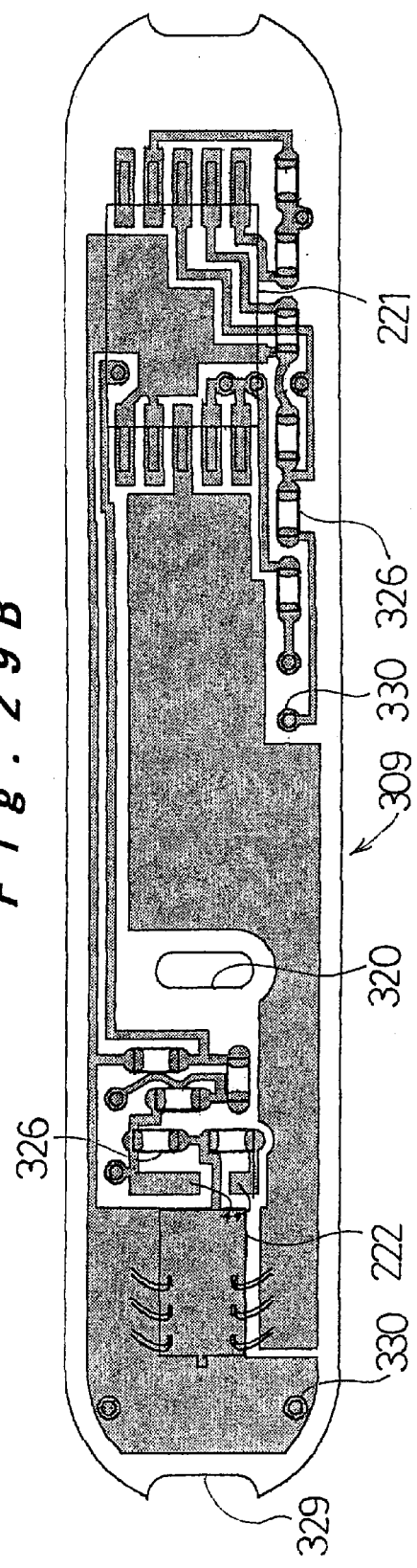

RECHARGEABLE BATTERY WITH PROTECTIVE CIRCUIT

TECHNICAL FIELD

The present invention relates to a rechargeable battery, such as a lithium ion rechargeable battery, particularly of a flat shape, which is integrated with a battery protection circuit so that the rechargeable battery itself has a function of protecting against overcharging, overdischarging, and so forth.

BACKGROUND ART

Rechargeable batteries are provided with a variety of protective functions for preventing damage to the battery caused by abnormal use such as overcharging, overdischarging, short-circuiting between the positive and negative electrodes, or short-circuiting of the battery peripheral circuitry of the device in which the battery is used. Examples of these functions include PTC (Positive Temperature Coefficient) elements that prevent excessive discharge current due to short-circuiting or the like, and safety vents that release internal pressure by cutting off the power circuit in the event of an abnormal rise in internal pressure caused by overcharging. These protective functions are known as functions incorporated into the rechargeable battery itself. A lithium ion rechargeable battery is normally provided with a battery protection circuit to prevent overcharging, overdischarging, and so forth. Such battery protection circuit is generally unitized with the battery as part of battery pack configuration, in which a circuit board that makes up the battery protection circuit is integrally contained in the pack case along with the lithium ion rechargeable battery. It is common knowledge that battery packs such as this, in which the rechargeable battery and the protection circuit are integrally housed in a case, are often used for battery-powered devices such as cellular telephones and laptop computers.

In addition to preventing overcharging and overdischarging as mentioned above, this battery protection circuit can also have such functions as cutting off excessive current or monitoring cell temperature, and if this circuit could be integrated with the rechargeable battery itself, it would be possible to create a rechargeable battery equipped with a battery protection circuit without constituting a battery pack, which would make the rechargeable battery more universally applicable.

When a battery protection circuit is integrated with a rechargeable battery, however, it is difficult to avoid making the external dimensions larger or losing the original configuration of the rechargeable battery. In particular, a flat-shaped rechargeable battery is made thin so that it can be used in small devices such as portable devices, and when a battery protection circuit is integrated with such a rechargeable battery it is difficult to find space for the circuit board that makes up the battery protection circuit, which means that it is difficult to integrate a battery protection circuit without increasing the external dimensions.

Also, with a small, flat-shaped rechargeable battery, there is little space in which to provide the above-mentioned PTC element or current cut-off vent, so the elements for electromotive force must be reduced in size in order to ensure this space, the problem with which is that the battery capacity is diminished. Therefore a PTC element must be provided as part of the battery protection circuit outside the rechargeable battery, and the battery protection circuit must take over the function of the current cut-off vent. However, if a PTC element is provided as part of the battery protection circuit, then an increase in volume is inevitable when the battery protection circuit is integrated with the rechargeable battery, which is contrary to the objective of minimizing the increase in external dimensions. Also, reliability suffers when an ordinary battery protection circuit is made to take on the function of a current cut-off vent, making it difficult to obtain a level of reliability at which the rechargeable battery will definitely be protected.

It is an object of the present invention to provide a battery equipped with a battery protection circuit, with which a compact construction that can be applied to a flat-shaped rechargeable battery minimizes the increase in the external dimensions of the rechargeable battery, and with which the battery can be protected by enhancing the function of the battery protection circuit and without providing a PTC element or a current cut-off vent, and which can be used by itself as a battery, without a battery pack configuration being required.

DISCLOSURE OF THE INVENTION

To achieve the above object, a first aspect of the present invention provides a rechargeable battery equipped with a battery protection circuit for protecting this rechargeable battery from overcharging and overdischarging, comprising:

a cell case made of a bottomed cylindrical container, containing therein elements for electromotive force;

a sealing plate for sealing an open end of said cell case;

a protruding terminal provided insulated from the cell case on said sealing plate, said cell case and said protruding terminal being respectively assigned as a positive electrode and a negative electrode of the rechargeable battery;

a connection piece joined to the protruding terminal, a circuit board which includes a plurality of input and output terminals and constitutes a battery protection circuit, and to which said connection piece is connected at a specific location, and a spacer that keeps the circuit board and the cell case apart, all of which are disposed at one end on the side of the sealing plate of the cell case; and a cover cap disposed so as to envelop the circuit board, the spacer, and the connection piece in a state in which said plurality of input and output terminals on the circuit board are exposed to the outside, and at the same time to cover the peripheral part of the cell case, said cover cap being connected at a specific location of the circuit board.

With the above structure, the rechargeable battery and the circuit board are electrically connected by the cover cap and the connection piece through the positive and negative electrodes of the rechargeable battery, and are integrated by the cover cap. Because the input and output terminals provided on the circuit board are exposed on the outside, the rechargeable battery with its internally integrated battery protection circuit can be handled and used just the same as a rechargeable battery alone.

In the above structure, the cover cap can be provided so as to cover the entire surface of the peripheral part of the cell case, which securely maintains the integration of the rechargeable battery and the circuit board that makes up the battery protection circuit.

Also, if at least one inward cutout is formed in the peripheral part of the cover cap, this is bent inward to hit the top of the cell case, and at least one opening is formed in the peripheral part after it has been bent, the cover cap will be fixed more securely to the rechargeable battery, and at the same time an opening will be formed communicating with the sealing assembly of the rechargeable battery, thereby forming a gas escape hole for releasing any abnormally high pressure inside the rechargeable battery.

The plurality of input and output terminals provided on the circuit board can be disposed asymmetrically, which prevents the cell from being installed backwards.

The outside of the circuit board can be covered with a cover plate provided with windows that open over the input and output terminals, which protects the circuit board.

If the outer side of the mounting location of an IC disposed on the inner side of the circuit board is at least 0.1 mm away from the cover plate, then the electrical effect caused by the application of pressure from the outside to the IC can be prevented.

If the connection piece is disposed on the protruding terminal of the rechargeable battery, and the underside of the circuit board is supported by this connection piece alone or by both the connection piece and the spacer, then the input and output terminals, which are subjected to contact pressure from the device side, will be supported from their underside, so stable connected is achieved.

If positioning components with respect to the rechargeable battery are formed in the spacer, it will be easier to install the spacer on the rechargeable battery.

If a notch is formed in the spacer at a location corresponding to the cutout formed in the cover cap, this will ensure a gas escape passage communicating with the opening formed by the cutout from the rechargeable battery.

If a conductor pattern connected to a ground potential is formed on at least the outer side of the circuit board at the location where the battery protection circuit (IC) is disposed, then a shielding effect will also be obtained from the conductor pattern, and the electrical effect that electromagnetic waves emitted from the device side would otherwise have on the IC can be prevented.

If the conductor pattern formed directly under the battery protection circuit is connected at a proximal location to a thermistor disposed on the inner side of the circuit board, then the temperature of the IC, which conducts heat through the conductor pattern, can be sensed by the thermistor, and the thermistor that is on the inner side of the circuit board and detects the generation of heat in the rechargeable battery will also be sensitive to the heat of the IC and can be used for temperature sensing of the rechargeable battery and the IC.

If the connection piece is such that the portion joined with the protruding terminal is formed in a thickness corresponding to the.distance between the protruding terminal and the circuit board, and connecting leads to the circuit board are formed at both ends, then the middle part of the circuit board can be supported by the connection piece.

If the side peripheral surface is covered with an electrically insulating sheet, then the side peripheral surface where one of the polar terminals of the cell is exposed will be insulated and covered, allowing unexpected short-circuiting to be prevented.

If a perforated line surrounding the opening formed in the cover cap is formed in the sheet at a location corresponding to this opening, then the opening used for gas escape will not be blocked off, and instead the sheet will tear out along the perforated line during gas release.

If at least one, and preferably all, of the connection piece, the input and output terminals, and the cover cap is or are formed from a nickel-copper alloy, then there will be better compatibility to joining by soldering, spot welding, and so forth, affording better compatibility to the type of joining means used at the connection location.

A second aspect of the present invention provides a rechargeable battery equipped with a battery protection circuit for protecting this rechargeable battery from overcharging and overdischarging, comprising:

a cell case made of a bottomed cylindrical container, containing therein elements for electromotive force;

a sealing assembly for sealing an open end of said cell case;

a protruding terminal provided insulated from the cell case on said sealing assembly, said cell case and said protruding terminal being respectively assigned as a positive electrode and a negative electrode of the rechargeable battery;

a connection piece joined to said protruding terminal, a circuit board on which a battery protection circuit is formed and on which a plurality of input and output terminals are formed, and a spacer that forms a seat for the circuit board and keeps the circuit board and the rechargeable battery apart, all of which are disposed at one end on the side of the sealing assembly of the cell case;

a lead plate joined to the cell case, said lead plate and said connection piece being respectively connected at specific locations of the circuit board so that the rechargeable battery and the circuit board are integrated, and the rechargeable battery and the battery protection circuit are electrically connected, with the positive and negative electrodes of the rechargeable battery being connected via the battery protection circuit to said respective input and output terminals of the circuit board;

an upper insulation board disposed on the circuit board with openings formed at locations corresponding to said input and output terminals;

a lower insulation board disposed on a bottom surface of the cell case; and an insulating sheet for covering the entire side peripheral surface of the cell case between peripheral edges of the upper insulation board and the lower insulation board.

With the above structure, because the circuit board is disposed on the rechargeable battery via a spacer, and the rechargeable battery is connected to the battery protection circuit on this circuit board by the connection piece and the lead plate, the rechargeable battery is formed as a rechargeable battery equipped with a battery protection circuit connected to the input and output terminals formed on the circuit board through the battery protection circuit. By insulating and covering all of this rechargeable battery except for the input and output terminals with the upper insulation board, the lower insulation board, and the insulating sheet, the resulting rechargeable battery equipped with a battery protection circuit has a compact configuration in which just the input and output terminals are exposed on the outside.

A third aspect of the present invention provides a rechargeable battery equipped with a battery protection circuit for protecting this rechargeable battery from overcharging and overdischarging, comprising:

a cell case made of a bottomed cylindrical container, containing therein elements for electromotive force;

a sealing assembly for sealing an open end of said cell case;

a protruding terminal provided insulated from the cell case on said sealing assembly, said cell case and said protruding terminal being respectively assigned as a positive electrode and a negative electrode of the rechargeable battery;

a connection piece joined to said protruding terminal, a circuit board on which a battery protection circuit is formed and on which a plurality of input and output terminals are formed, and a spacer that forms a seat for the circuit board and keeps the circuit board and the rechargeable battery apart, all of which are disposed at one end on the side of the sealing assembly of the cell case;

a lead plate joined to the cell case, said lead plate and said connection piece being respectively connected at specific locations of the circuit board so that the rechargeable battery and the circuit board are integrated, and the rechargeable battery and the battery protection circuit are electrically connected, with the positive and negative electrodes of the rechargeable battery being connected via the battery protection circuit to said respective input and output terminals of the circuit board, thereby constituting a rechargeable battery with a battery protection circuit; and a pack case in which openings are formed at locations corresponding to said input and output terminals for accommodating therein said rechargeable battery with the battery protection circuit.

With the above structure, because the circuit board is disposed on the rechargeable battery via a spacer, and the rechargeable battery is connected to the battery protection circuit on this circuit board by the connection piece and the lead plate, the rechargeable battery is formed as a rechargeable battery equipped with a battery protection circuit connected to the input and output terminals formed on the circuit board through the battery protection circuit. By housing this rechargeable battery in a pack case having openings at locations corresponding to the input and output terminals, the resulting rechargeable battery equipped with a battery protection circuit has a compact configuration in which just the input and output terminals are exposed on the outside.

In the above structure, if the connection piece and the lead plate are connected to the circuit board by a pair of leads, then the circuit board will be supported more securely on the rechargeable battery.

The plurality of input and output terminals provided on the circuit board can be disposed asymmetrically, which prevents the cell from being installed backwards.

The conductor patterns formed on the circuit board can be used directly as the input and output terminals, allowing the cell to be used in a fixed state in which it is not removed the device in which it is used.

The input and output terminals can comprise metal sheets joined to conductor patterns formed on the circuit board, which allows the cell to be used in applications in which it can be removed from the device.

If positioning components for the rechargeable battery and a housing component for the electronic parts mounted on the circuit board are formed in the spacer, then the spacer can be positioned on the rechargeable battery, the thickness of the electronic parts on the circuit board located thereon will be absorbed within the spacer, and the space taken up by the circuit board can be kept to a minimum.

If the spacer is adhesively joined to the rechargeable battery, the circuit board can be positioned and held at the proper location.

The insulating sheet can be formed from a material that is heat-shrinkable and self-adhesive, which allows the constituent elements to be securely enveloped, and a rechargeable battery with an attractive appearance to be formed.

The insulating sheet can have a design on its surface, which provides an attractive appearance and at the same time allows usage instructions, warnings, or the like to be indicated.

If steps for determining the covering position of the insulating sheet are formed around the peripheral edges of the upper insulation board and the lower insulation board, the tail end of the covered insulating sheet can be accommodated within these steps.

A recess for accommodating the lead plate and a recess into which the bottom of the cell case fits can be formed in the lower insulation board, which allows the lead plate to be accommodated and positioned at the bottom surface of the rechargeable battery.

If the battery protection circuit is equipped with a main control circuit and a sub-control circuit for redundantly protecting the rechargeable battery from overcharging, then the rechargeable battery will be redundantly protected from overcharging that could damage it, eliminating the need for other means for preventing excessive current.

The battery protection circuit can be configured as a circuit with no PTC by being a circuit for preventing excessive current, which allows-the battery protection circuit to be more compact.

The configuration of the battery protection circuit allows the rechargeable battery to have no PTC in its interior, and eliminating the PTC makes it possible to increase the volume of the elements for electromotive force and raises the cell capacity.

Since overcharging is effectively prevented by the redundant anti-overcharging function had by the battery protection circuit, increases in the internal cell pressure due to overcharging are prevented, so the rechargeable battery does not have to have a current cut-off vent in its interior, which makes it possible to increase the volume of the elements for electromotive force and raises the cell capacity.

A fourth aspect of the present invention provides a rechargeable battery equipped with a battery protection circuit for protecting this rechargeable battery from overcharging and overdischarging, comprising:

a cell case made of a bottomed cylindrical container, containing therein elements for electromotive force;

a sealing assembly for sealing an open end of said cell case;

a protruding terminal provided insulated from the cell case in the middle of said sealing assembly, said cell case and said protruding terminal being respectively assigned as a positive electrode and a negative electrode of the rechargeable battery;

a circuit board disposed on the sealing assembly, on which are formed a battery protection circuit and a plurality of input and output terminals, the protruding terminal and the cell case being connected to said input and output terminals via said battery protection circuit;

an upper insulating holder which is disposed at one end on the side of the sealing assembly of the cell case and in which openings are formed at locations corresponding to the input and output terminals;

a lower insulating holder disposed at the bottom of the rechargeable battery, said upper insulating holder and said lower insulating holder respectively covering an upper and a lower parts of the rechargeable battery; and an insulating sheet for covering the peripheral side surface of the rechargeable battery.

With the above structure, the positive and negative electrodes of the rechargeable battery are connected to a plurality of input and output terminals formed on the circuit board via a battery protection circuit, and the surrounding area thereof is insulated and covered by an insulating sheet and an upper insulation holder and a lower insulation holder provided with openings at locations corresponding to the input and output terminals. A rechargeable battery equipped with a battery protection circuit can be achieved merely by providing enough space for the circuit board to be disposed on the sealing assembly of the rechargeable battery, without losing the original configuration of the rechargeable battery.

A fifth aspect of the present invention provides a rechargeable battery equipped with a battery protection circuit for protecting this rechargeable battery from overcharging and overdischarging, comprising:

a cell case made of a bottomed cylindrical container, containing therein elements for electromotive force;

a sealing assembly for sealing an open end of said cell case;

a protruding terminal provided insulated from the cell case in the middle of said sealing assembly, said cell case and said protruding terminal being respectively assigned as a positive electrode and a negative electrode of the rechargeable battery;

a connection piece joined to the protruding terminal, a circuit board on which a battery protection circuit and a plurality of input and output terminals are formed, and a spacer that forms a seat for the circuit board and keeps the circuit board and the rechargeable battery apart, all of which are disposed at one end on the side of the sealing assembly of the cell case;

a lead plate connected to the cell case, said lead plate and said connection piece being each connected at specific locations of the circuit board so that the rechargeable battery and the circuit board are integrated, and the rechargeable battery and the battery protection circuit are electrically connected, with the positive and negative electrodes of the rechargeable battery being connected via the battery protection circuit to the input and output terminals;

an upper insulating holder disposed at one end on the side of the sealing assembly of the cell case, covering the top of the circuit board, and having openings formed at locations corresponding to the input and output terminals;

linking members formed at the distal ends of a pair of extensions that extend from both sides of said upper insulating holder toward the bottom side of the cell case;

a lower insulating holder disposed at the bottom end of the cell case, covering the bottom of the cell case;

linking members formed at the distal ends of a pair of extensions that extend from both sides of said lower insulating holder toward the side of the sealing assembly of the cell case, the upper insulating holder and the lower insulating holder being-linked together via said linking members; and an insulating sheet for covering the side peripheral surface of the rechargeable battery including the side peripheral parts of the upper insulating holder and the lower insulating holder.

With the above structure, the circuit board is arranged on the rechargeable battery with the spacer interposed therebetween, and the rechargeable battery is connected to the battery protection circuit formed on the circuit board through the connection piece and the lead plate, whereby provided is the rechargeable battery equipped with the battery protection circuit, connected to the input and output terminals formed on the circuit board. By covering the rechargeable battery by the upper insulation holder, the lower and insulation holder and the insulation sheet with only the input and output terminals exposed to outside, it is possible to obtain a rechargeable battery equipped with a battery protection circuit with only the input and output terminals exposed to outside.

In the above structure, it is favorable for the rechargeable battery to be one with a flat shape having an oval cross section, which can be used as a power source for portable devices that are intended to be small and thin.

The electronic parts mounted at the sealed end of the circuit board can be disposed at locations corresponding to recesses formed in the sealing assembly of the rechargeable battery, which reduces the amount that the battery protection circuit protrudes from the rechargeable battery.

If positioning components with respect to the rechargeable battery and the circuit board, and openings at locations corresponding to the electronic parts mounted on the circuit board are formed in the spacer, then the spacer will be positioned when mounted on the rechargeable battery, the electronic parts mounted on the sealing assembly side of the circuit board will fit in the openings, and the battery protection circuit will take up less space.

If the positioning components are disposed in parallel in the lengthwise direction of the protruding terminal, then insulation between the cell case and the connection piece can be increased at the same that positioning is performed.

The plurality of input and output terminals provided on the circuit board can be disposed asymmetrically, which prevents the rechargeable battery from being installed backwards.

A step for determining the covering position of the insulating sheet can be formed around the side periphery of the upper insulating holder, which allows the insulating sheet to be positioned while being stuck on.

If covering components that cover the short side surface and part of the long side surface of the rechargeable battery formed in a flattened shape are formed for the upper insulating holder and the lower insulating holder, then the rechargeable battery and the battery protection circuit can be securely integrated, and since the upper and lower insulation holders do not cover the entire rechargeable battery, no change in the exterior dimensions occurs even if repeated charging and discharging or the like should cause the cell case to swell.

If the upper insulating holder and the lower insulating holder are linked by the superposition and/or engagement of the linking components thereof, the linking will be more secure.

The lead plates can be joined at one end to the bottom surface of the cell case and extend to the sealing assembly side along the short side surface of the flattened cell case, which does not increase the thickness of the flat-shape rechargeable battery.

If recesses or openings for accommodating the lead plates are formed in the extensions of the upper insulating holder and the lower insulating holder, then the position of the lead plates can be maintained while the increase in width is minimized.

The battery protection circuit can be a redundant protection circuit comprising a main control circuit for cutting off the charging/discharging circuit when a state such as overcharging or overdischarging is detected, and a sub-control circuit for cutting off the charging/discharging circuit when there is malfunction in this main control circuit, and the ground locations of the main and sub-control circuits can be separated, which results in the pair of lead plates, which are connected at one end to the cell case, being connected to the ground locations of the main control circuit and the sub-control circuit, between which there is no direct connection, so a closed circuit is not formed in the ground circuit, and the effect of noise that would otherwise be caused by a closed circuit can be reduced.

A sixth aspect of the present invention provides a rechargeable battery equipped with a battery protection circuit for protecting this rechargeable battery from overcharging and overdischarging, comprising:

- a cell case made of a bottomed cylindrical container, containing therein elements for electromotive force;
- a sealing assembly for sealing an open end of said cell case;
- a protruding terminal provided insulated from the cell case on said sealing assembly, said cell case and said protruding terminal being respectively assigned as a positive electrode and a negative electrode of the rechargeable battery;
- a circuit board disposed on said sealing assembly, including a battery protection circuit and a plurality of input and output terminals, wherein said cell case and said protruding terminal are each connected to said input and output terminals via the battery protection circuit, thereby constituting an intermediate unit in which the rechargeable battery and the circuit board are integrated; and
- an outer case in which openings are formed at locations corresponding to the input and output terminals for sealing therein said intermediate unit.

A seventh aspect of the present invention provides a rechargeable battery equipped with a battery protection circuit for protecting this rechargeable battery from overcharging and overdischarging, comprising:

- a cell case made of a bottomed cylindrical container, containing therein elements for electromotive force;
- a sealing assembly for sealing an open end of said cell case;
- a protruding terminal provided insulated from the cell case on said sealing assembly, said cell case and said protruding terminal being respectively assigned as a positive electrode and a negative electrode of the rechargeable battery;
- a connection piece joined to the protruding terminal, a circuit board on which a battery protection circuit and a plurality of input and output terminals are formed, and a spacer that forms a seat for the circuit board and keeps the circuit board apart from the rechargeable battery, all of which are disposed at one end on the side of the sealing assembly of the cell case,
- a lead plate joined to the cell case, said lead plate and said connection piece being each connected at specific locations of the circuit board so that the rechargeable battery and the circuit board are integrated, thereby constituting an intermediate unit in which the rechargeable battery and the battery protection circuit are electrically connected, with the positive and negative electrodes of the rechargeable battery being connected via the battery protection circuit to the input and output terminals of the circuit board; and
- an outer case in which said intermediate unit is inserted, said outer case being molded by resin molding in the form of a bottomed cylinder having an open end, with openings formed in the bottom surface at locations corresponding to the input and output terminals of the circuit board, said open end of the outer case being closed to seal the intermediate unit within the outer case.

With the above structures, the circuit board having the battery protection circuit is disposed on a sealing assembly of the rechargeable battery via a spacer, so the battery protection circuit can be connected to the rechargeable battery with only a minimum of increase in rechargeable battery height, and sealing this rechargeable battery in an outer case provided with openings at locations corresponding to the input and output terminals allows a rechargeable battery with a compact, integrated battery protection circuit to be produced.

In the above structures, the outer case can be such that the cross sectional outer shape is formed substantially oval with respect to the rechargeable battery that is formed in a cross sectional oval shape, and the inner shape is formed substantially oval corresponding to the outer shape of the rechargeable battery, the result of which is that the rechargeable battery equipped with a battery protection circuit has a rectangular shape that facilitates installation in a device, and at the same time the strength of the outer case is improved.

The outer case can also be such that sealing pieces that are extensions of the long side peripheral parts are formed at the open end of a bottomed box, these sealing pieces are bent inward and the opposing parts are fused together by hot pressing, thereby closing the open end and sealing the intermediate unit within the outer case, the result of which is that the intermediate unit can be sealed by a one-piece outer case.

It is favorable for the sealing pieces[2] to be such that the opposing long sides at the rectangular open end are formed in a notched shape so that the notches will fit together when the sealing pieces are bent, the result of which is that the fused mass is increased and sealing strength thereby improved.

The sealing pieces can be formed thicker at the fused portions thereof, which provides enough resin to be melted and makes more secure fusion possible.

If the sealing pieces are sized such that a gap is left between the opposing parts when the sealing pieces are bent, then there will be no overlap of the opposing pieces due to bending error, and the molten resin will work its way through the gap into the interior, filling in any gap resulting from dimensional error in the intermediate unit and absorbing the error.

If bumps are provided to the inner surface of the sealing pieces, then any gap resulting from dimensional error in the intermediate unit will be filled in by the bumps, allowing looseness to be prevented.

The outer case can be such that sealing pieces that are extensions of the side peripheral parts are formed at the open end of a bottomed box, and after the intermediate unit has been inserted, these sealing pieces are melted inward by hot pressing, thereby closing the open end, in which case the open end side of the intermediate unit, where the extended sealing pieces have been melted and inserted on the inside, will be filled in and this open end closed. Even if there is an error in the height of the intermediate unit, the outer case can be brought to the specified height by changing the amount of molten resin that flows into the gap in the outer case.

The plurality of input and output terminals can be disposed asymmetrically, which prevents the rechargeable battery from being installed in a device backwards.

BRIEF DESCRIPTION OF THE DRAWINGS

FIG. 1A is a plan view of a flat-shaped rechargeable battery applied in the various embodiments, and FIG. 1B is a cross section of this flat-shaped rechargeable battery;

FIG. 22A is a plan view of the front of the circuit board, and FIG. 22B is a plan view of the back of the circuit board;

FIG. 24A is a top view, FIG. 24B is a front view, FIG. 24C is a left side view, FIG. 24D is a right side view, and FIG. 24E is a bottom view, all showing another embodiment of the upper insulation holder;

FIG. 25A is a top view, FIG. 25B is a front view, FIG. 25C is a left side view, FIG. 25D is a right side view, and FIG. 25E is a bottom view, all showing another embodiment of the lower insulation holder;

FIG. 29A is a plan view of the front of the circuit board, and FIG. 29B is a plan view of the back of the circuit board;

BEST MODE FOR CARRYING OUT THE INVENTION

Figure 2:
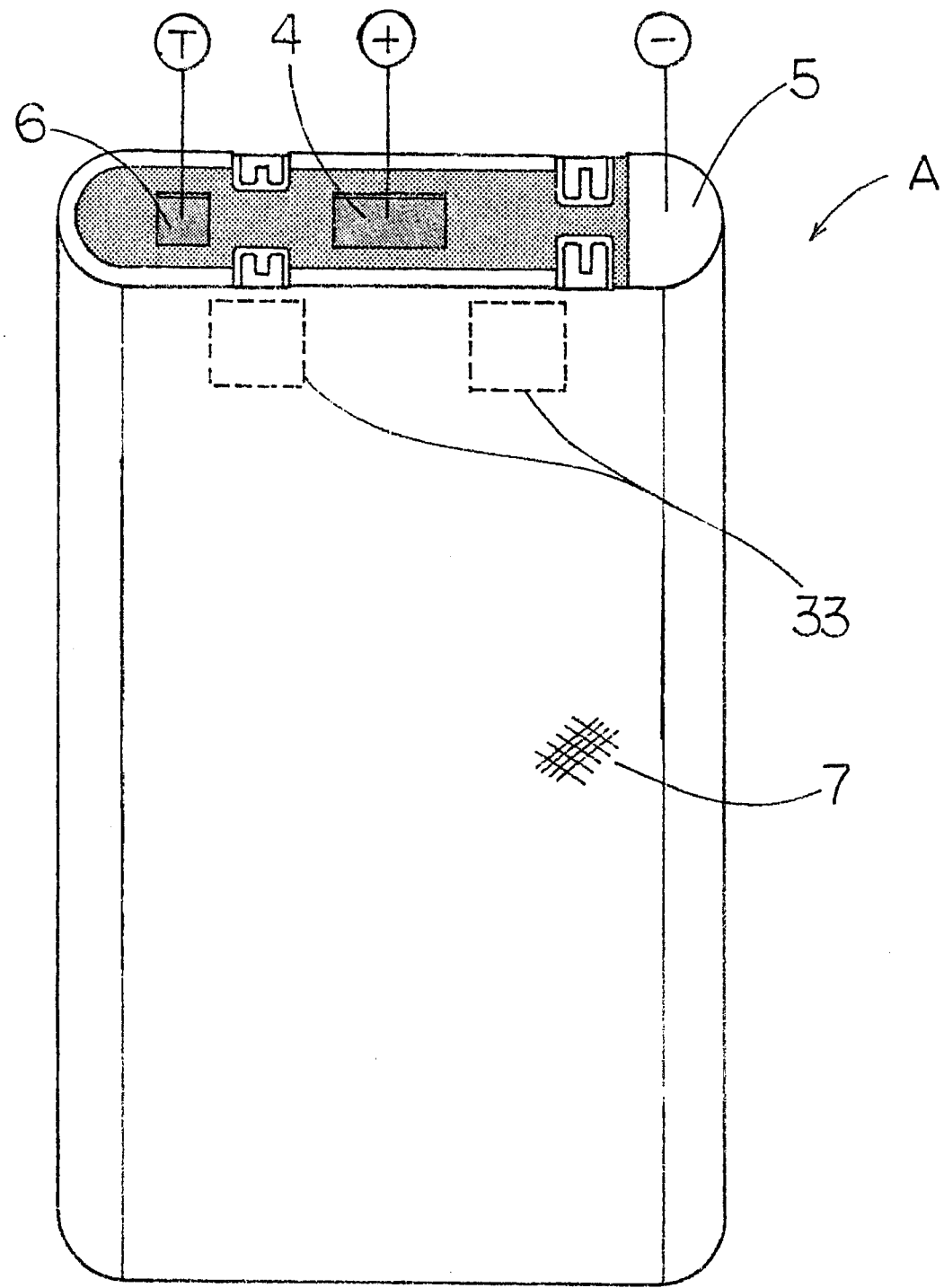
FIG. 2 is an oblique view of the rechargeable battery A equipped with a battery protection circuit according to a first embodiment.

Embodiments of the present invention will now be described through reference to the appended figures in an effort to facilitate an understanding of the present invention. The embodiments given below are specific examples of the present invention, but are not intended to limit the technological scope thereof.

The "rechargeable battery equipped with a battery protection circuit" according to the present invention will be hereinafter referred to as "circuit protected cell" to distinguish it from the rechargeable battery 10 alone. Various circuit protected cells A to E will be described in the following various embodiments. Typically, a circuit protected cell in accordance with the present invention comprises a lithium ion rechargeable battery 10 formed in a flat shape (hereinafter referred to merely as a rechargeable battery), and a battery protection circuit integrally attached thereto for protecting this rechargeable battery 10 from overcharging, overdischarging, and so forth, with the height of the rechargeable battery 10 being only slightly increased.

As shown in FIGS. 1A and 1B, the rechargeable battery 10 is in a compact, flat-shaped form in which elements for electromotive force 133 are housed in a cell case 26 formed as a bottomed cylinder with an oval cross section, and the open end of the cell case 26 is sealed by a sealing assembly comprising a gasket 135, a sealing plate 132, and an electrode cap 134. The positive electrode plates that make up part of the elements for electromotive force 133 are connected to the electrode cap 134, which is insulated from the cell case 26 by the gasket 135, and the middle protruding portion of the electrode cap serves as the positive electrode input and output terminal 25 of the rechargeable battery 10. The negative electrode plates that make up part of the elements for electromotive force 133 are connected to the cell case 26, and the cell case 26 serves as the negative electrode input and output terminal of the rechargeable battery 10.

Figure 3:
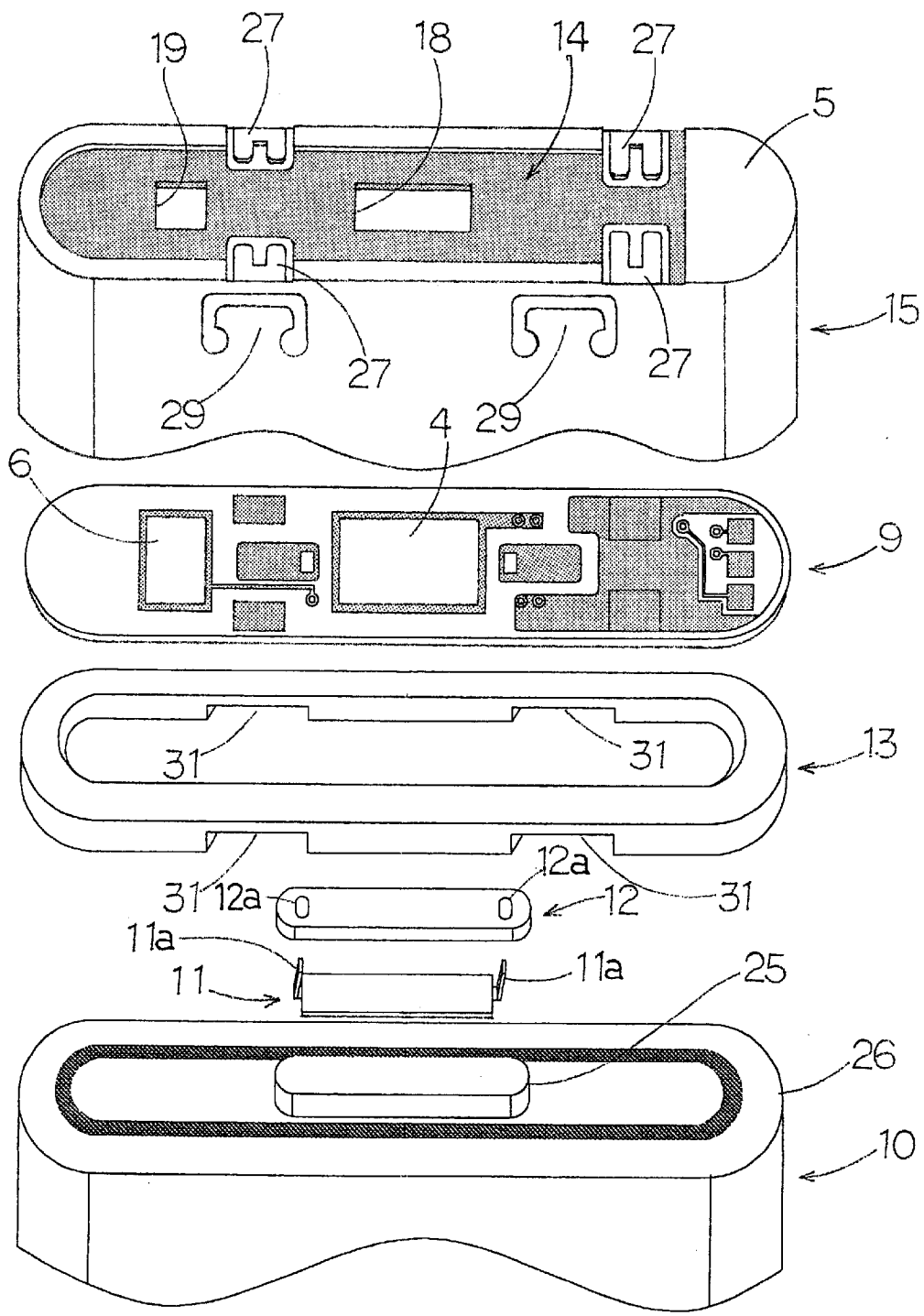
FIG. 3 is an oblique view of the assembly structure of rechargeable battery A in which the various constituent elements thereof are exploded.

As shown in FIG. 2, the circuit protected cell A according to the first embodiment is structured such that a positive terminal plate 4, a negative terminal plate 5, and a temperature sensing terminal plate 6 are exposed at the top, and the rechargeable battery 10 and the battery protection circuit are integrally incorporated into a casing covered around its sides with an insulating label 7. FIG. 3 is an exploded view of the internal structure of this circuit protected cell, which is provided with the rechargeable battery 10; a connection piece 11 joined to the positive electrode input and output terminal (protruding terminal) of this rechargeable battery 10; a central spacer 12 that is disposed on the top surface of this connection piece 11 and provides a seat for the middle part of a circuit board 9; a peripheral spacer 13 that is formed in an oval ring shape, keeps the rechargeable battery 10 apart from the circuit board 9, and provides a seat for the circuit board 9; a circuit board 9 that constitutes the battery protection circuit and has formed on it the positive terminal plate 4 and the temperature sensing terminal plate 6; a cover plate 14 formed by resin molding and provided with a positive terminal window 18 and a temperature sensing terminal window 19 through which the positive terminal plate 4 and the temperature sensing terminal plate 6 formed on this circuit board 9 are exposed to the outside; and a cover cap 15 that envelops the various constituent elements disposed on the rechargeable battery 10, comes into contact with the cell case 26 that serves as the negative electrode input and output terminal of the rechargeable battery 10, and covers the outer peripheral surface of this cell case 26. These constituent elements are assembled on the rechargeable battery 10 as shown in the cross section of FIG. 4.

First, the connection piece 11 is joined to the positive electrode input and output terminal 25 of the rechargeable battery 10, leads 11a formed extending from both ends of this connection piece 11 are passed through openings 12a of the central spacer 12, whereby the central spacer 12 is disposed on the connection piece 11. When the peripheral spacer 13 is placed around the periphery of the rechargeable battery 10, the tops of the central spacer 12 and the peripheral spacer 13 are aligned at the same height, so the circuit board 9 can be stably placed over these.

Figure 5A:
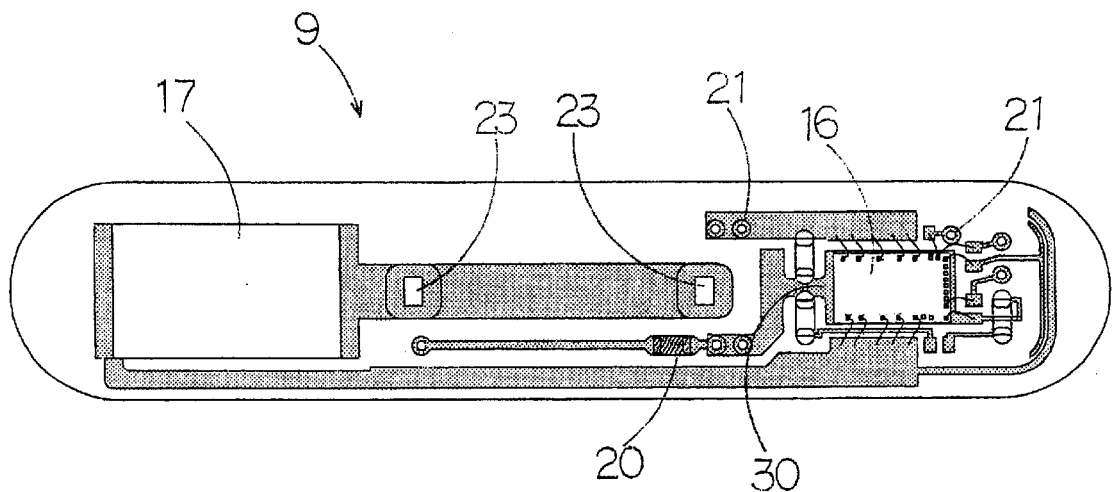
FIG. 5A is a plan view of the structure on the underside of the circuit board.
Figure 5B:
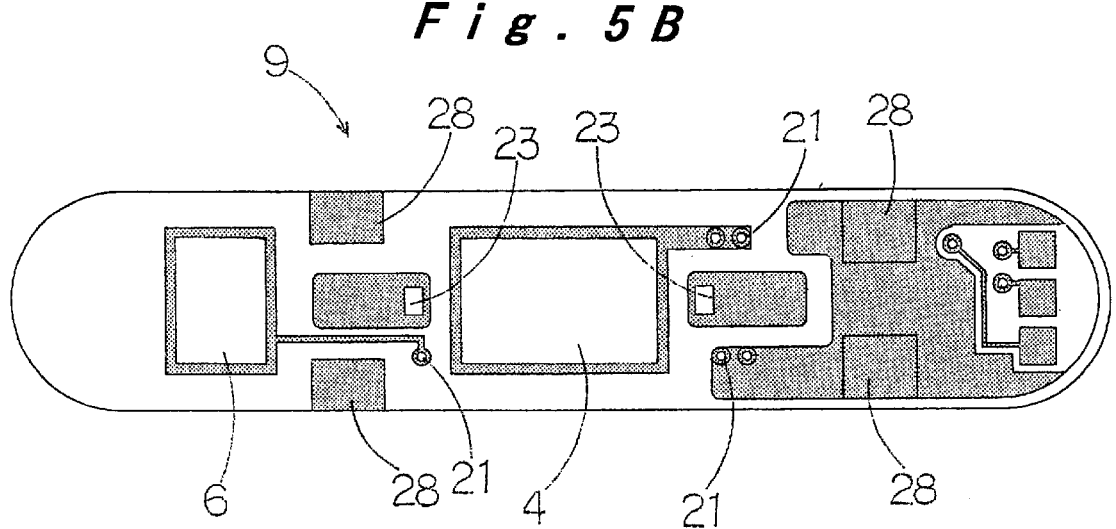
FIG. 5B is a plan view of the structure on the top side of the circuit board.

FIG. 5A shows the structure on the underside of the circuit board 9, and FIG. 5B the structure on the top side of the circuit board 9. The leads 11a of the connection piece 11 are passed through lead holes 23 formed in the circuit board 9, and are bent over on the top of the circuit board 9 and soldered in place on the conductor pattern.

As shown in FIG. 5A, an IC 16 which constitutes a battery protection circuit that protects the rechargeable battery 10 from overcharging and overdischarging, a PTC element 17 that prevents excessive current, a thermistor 20 that senses the temperature of the rechargeable battery 10 and the IC 16, and so forth are disposed on the underside of the circuit board 9. As shown in FIG. 5B, the positive terminal plate 4 and the temperature sensing terminal plate 6 are disposed on the top side of the circuit board 9, joined to the conductor pattern formed on the substrate. The conductor pattern formed on the top side of this circuit board 9 is connected to the conductor pattern formed on the underside by through holes 21 at the required places. Since conductor patterns are formed on the top side and the underside at the places where the IC 16 is provided, the IC 16 is shielded by the conductor patterns, and this reduces the incidence of malfunction of the IC 16 caused by electromagnetic waves, such as wave fogging, even when this circuit protected cell is used in a cellular telephone or the like.

Figure 4:
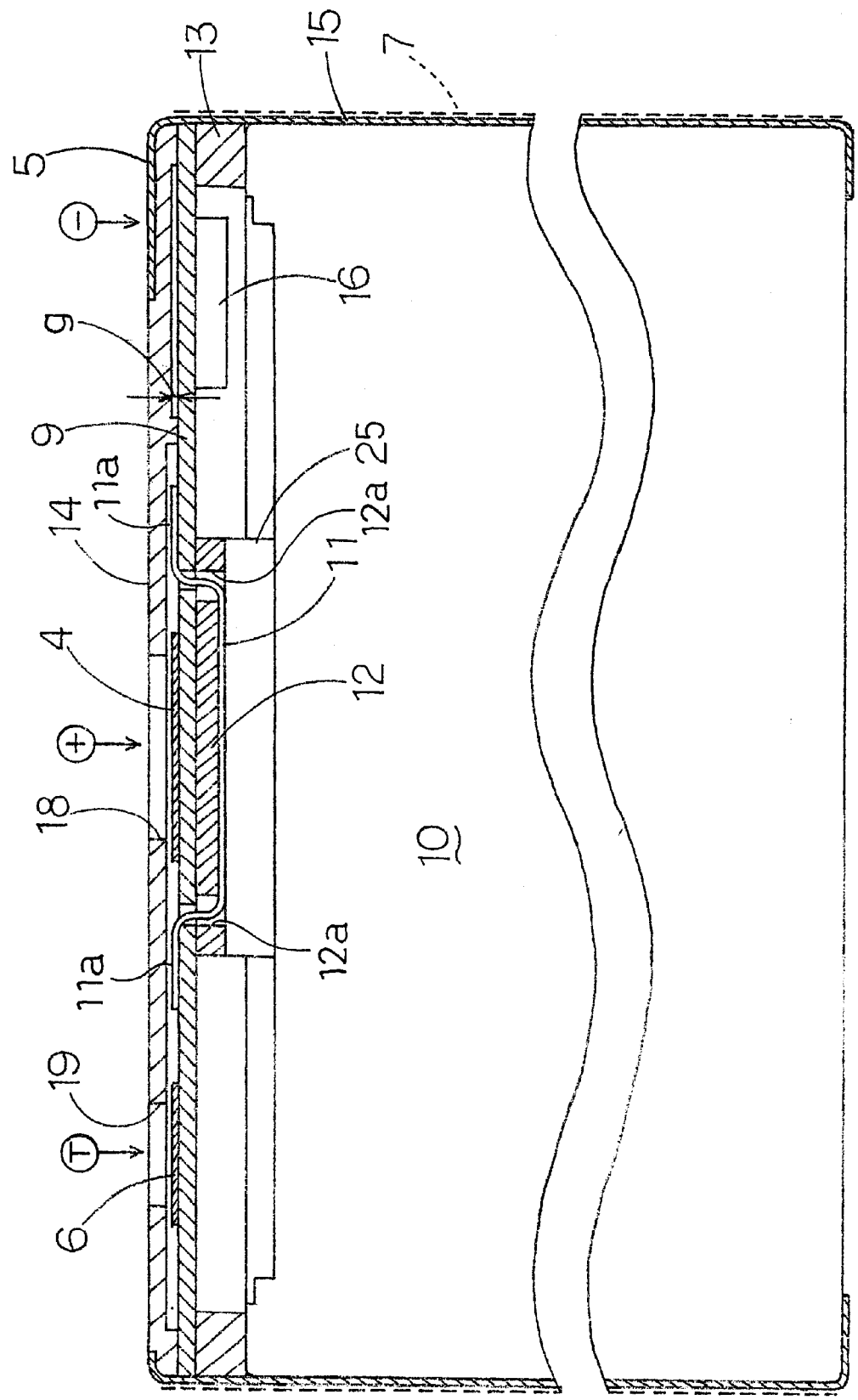
FIG. 4 is a cross section of the structure of the battery protection circuit provided to the rechargeable battery.

A cover plate 14, in which a positive terminal window 18 and a temperature sensing terminal window 19 are made at locations corresponding to the positive terminal plate 4 and the temperature sensing terminal plate 6, is disposed on the top side of the circuit board 9. Here, as shown in FIG. 4, on top side, that is, the opposite side from where the IC 16 is provided on the underside, a gap g of at least 0.1 mm is provided between the cover plate 14 and circuit board 9. This keeps pressure from being applied to the IC 16 in the event that external pressure should be applied by vibration, impact, or the like, and changes in the electrical performance that would be caused by deformation of the IC 16 by this pressure can be prevented by providing the gap g.

A cover cap 15 covers the periphery of this cover plate 14, and this cover cap 15 also covers the entire peripheral sides of the rechargeable battery 10. As shown in FIG. 3, connecting pieces 27 formed at four places around the top edge of the cover cap 15 are soldered to connection patterns 28 formed at four places on the top side of the circuit board 9, and the ground potential of the circuit board 9 is connected to the cover cap 15 which is in contact with the cell case 26, which is the negative electrode input and output terminal of the rechargeable battery 10. With this connection structure, the top side end of the cover cap 15 functions as the negative terminal plate 5. As shown in FIG. 3, cutouts 29 formed at two places along each of the long side surfaces of the cover cap 15 are bent inward until they hit the upper periphery of the rechargeable battery 10, which snugly fits the cover cap 15 to the rechargeable battery 10, and at the same time, the openings left after the cutouts 29 have been bent function as gas escape holes for releasing any abnormal pressure in the rechargeable battery 10. These gas escape holes open out on the sides, so in the unlikely event that gas should spurt from the rechargeable battery 10, it will spurt out from the openings that are perpendicular to the spurting direction, which weakens the spurting pressure. The openings produced by these cutouts 29 are hidden by the insulating label 7 when the side peripheral surfaces of the cover cap 15 are covered with the insulating label 7, but as shown in FIG. 2, perforated lines 33 are made in the insulating label 7 at locations corresponding to the cutouts 29, and these perforated lines 33 tear out in the event of a gas eruption. Also, notches 31 are formed at four places in the peripheral spacer 13 to accommodate the inward bending of the cutouts 29, and this provides gas escape channels.

Figure 6A:
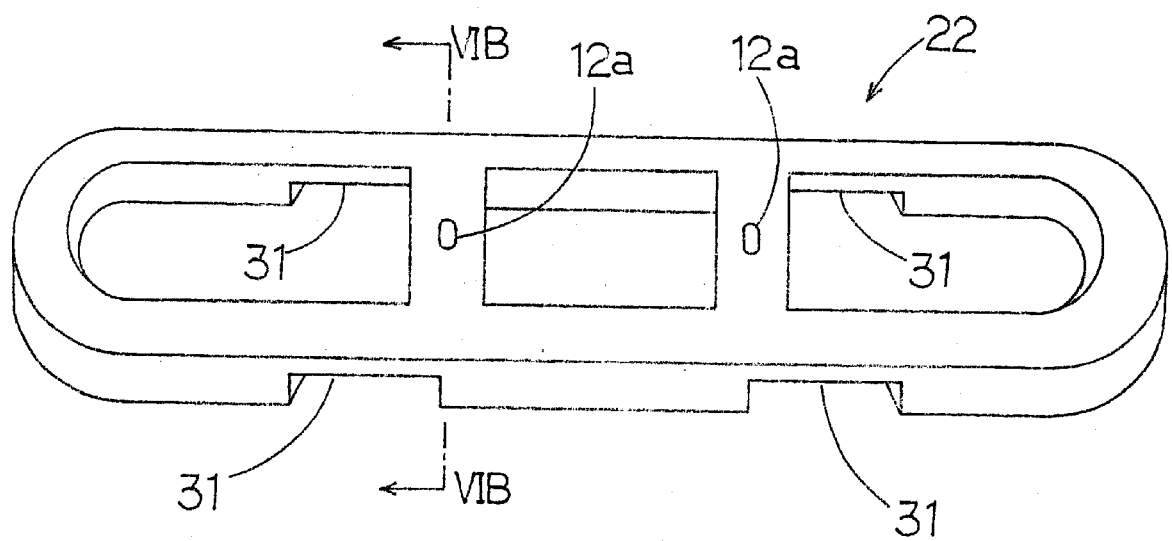
FIG. 6A is an oblique view of a variation example of the spacer.
Figure 6B:
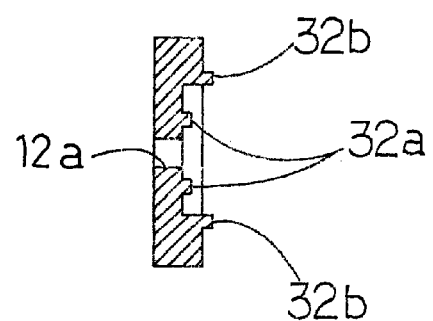
FIG. 6B is a cross section along the VIB—VIB line in FIG. 6A.

A modification can be made, as shown in FIG. 6A, such that the peripheral spacer 13 and the central spacer 12 are integrated into a single spacer 22. As shown in FIG. 6B, in the middle of the underside of this spacer 22 are formed positioning tabs 32a that fit into the positive electrode input and output terminal 25 of the cell 10, and positioning tabs 32b that fit into a crimp recess around the periphery of the top side, and this makes it easy to position the spacer 22 on the rechargeable battery 10.

As shown in FIG. 2, the circuit protected cell structured as above allows the battery protection circuit to be housed internally merely by extending the height of the rechargeable battery 10 a small amount. When this circuit protected cell is installed in a device, reliability is higher since it has its own battery protection function. Also, the positive terminal (+), the negative terminal (−), and the temperature sensing terminal (T) are disposed asymmetrically to the left and right on the top, which prevents the cell from being installed backwards in the device.

Figure 7:
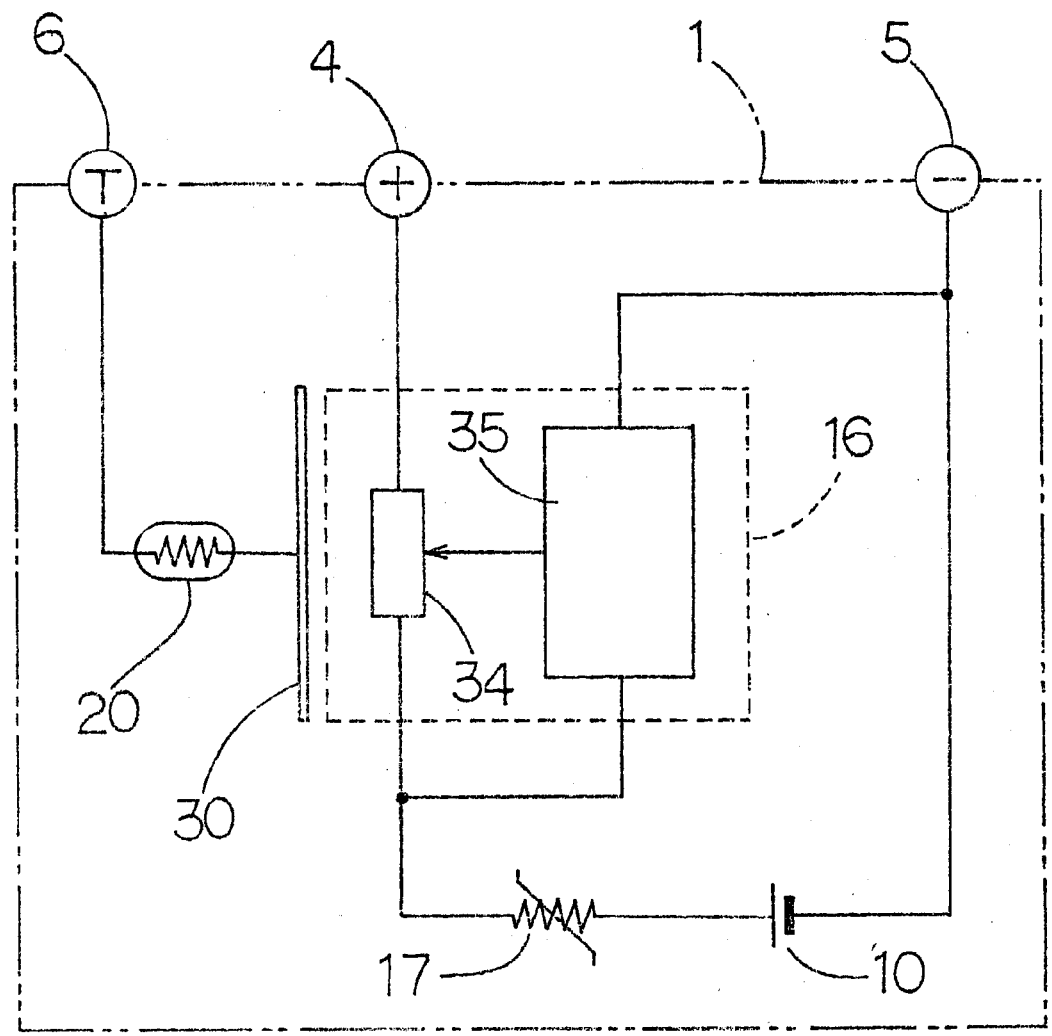
FIG. 7 is a circuit diagram illustrating the electrical structure of the rechargeable battery equipped with a battery protection circuit according to the same embodiment.

FIG. 7 shows the electrical circuit structure of the circuit protected cell A described above. The electrical structure of this circuit protected cell will now be described through comparison of this electrical circuit with the structures shown in FIGS. 2 to 5A and 5B.

The cell case 26 that constitutes the negative electrode input and output terminal of the rechargeable battery 10 is connected to the cover cap 15, and the negative terminal plate 5 is exposed at the top end of the circuit protected cell. Meanwhile, the positive electrode input and output terminal 25 is connected to the circuit board 9 by the connection piece 11, connected to the PTC element 17 disposed on the circuit board 9, and connected to the positive terminal plate 4 through an FET 34 included in the IC 16. The PTC element 17 generates heat as a result of excessive current due to temperature-resistance changes in its positive characteristics, and as the temperature rises, resistance increases and prevents excessive current from building up. The FET 34 is turned on and off by a control circuit 35 that detects overcharging or overdischarging, and protects the rechargeable battery 10 from overcharging or overdischarging by cutting off the positive circuit in the event of overcharging or overdischarging.

The thermistor 20 provided on the underside of the circuit board 9 as shown in FIG. 5A, that is, on the rechargeable battery 10 side, is connected to the temperature sensing terminal plate 6, reacts to temperature changes in the rechargeable battery 10, and varies the resistance thereof, so when the device in which this circuit protected cell is used is connected to the temperature sensing terminal plate 6, the temperature of the circuit protected cell can be sensed in order to deal with any abnormal rise in temperature. Also, as shown in FIG. 5A, the thermistor 20 is connected to the conductor pattern 30 at the location where the IC 16 is disposed, so temperature changes in the IC 16 impart a temperature change to the thermistor 20 by thermal conduction through the conductor pattern 30, which varies the resistance, so temperature changes in the IC 16 can also be detected. Therefore, any abnormal rise in temperature of the IC 16 accompanying a rise in temperature of the rechargeable battery 10 on the device side can also be detected.

The connection piece 11, the cover cap 15, the positive terminal plate 4, and the temperature sensing terminal plate 6 in the circuit protected cell described above are made from a nickel-copper alloy, so that there is better compatibility to joining by soldering, spot welding, and so forth. For instance, the connection piece 11 may be joined to the positive electrode input and output terminal 25 of the rechargeable battery 10 by spot welding or ultrasonic welding, and the leads 11a extending from both ends of this connection piece 11 may be soldered to the conductor pattern of the circuit board 9. Even when a single member is joined at different portions by different methods, a nickel-copper alloy is compatible with both of the joining methods, allowing a good joint to be obtained. Similarly, with the cover cap 15, the connecting pieces 27 may be soldered to the circuit board 9, and the rechargeable battery 10 may be joined to the cell case 26 by ultrasonic welding or spot welding, and once again a nickel-copper alloy is compatible with both of these joining methods. Also, the positive terminal plate 4, the temperature sensing terminal plate 6, and the negative terminal plate 5 formed on top end of the cover cap 15 serve as connection contacts that conduct current through contact with the connection probes of the device in which this circuit protected cell is used, and lower contact resistance can be achieved by using a nickel-copper alloy.

Figure 8A:
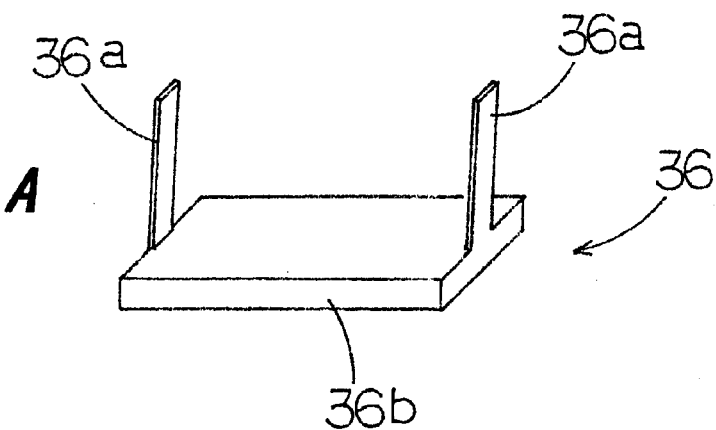
FIG. 8A and FIG. 8B are oblique views of variation examples of the connection piece.
Figure 8B:
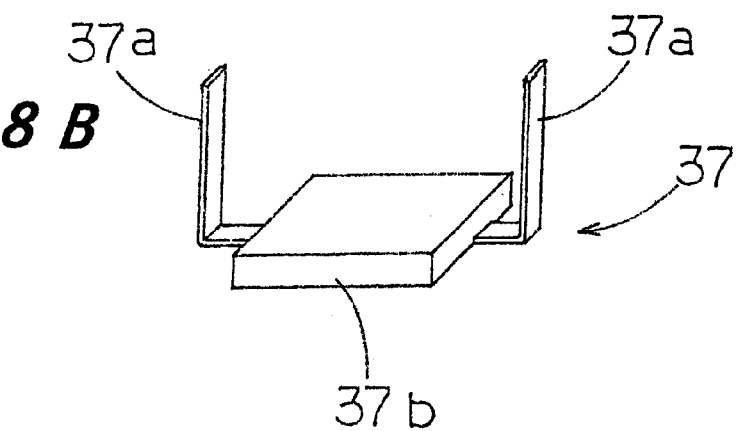

Modified structures of connection piece are shown denoted at 36 and 37 in FIGS. 8A and 8B, wherein the connection piece 11 for connecting the positive electrode input and output terminal 25 of the rechargeable battery 10 to the circuit board 9 is combined with the central spacer 12. The central spacer 12 supporting the middle part of the circuit board 9 is eliminated and its support function is given to the connection piece 36 or 37. The connection pieces 36 and 37 have bases 36b and 37b, respectively, that are formed in a thickness corresponding to the gap between the positive electrode input and output terminal 25 and the circuit board 9, and from the ends of which extend leads 36a and 37a, respectively. When the connection piece 36 or the connection piece 37 is joined on the positive electrode input and output terminal 25 and the circuit board 9 disposed thereon, the middle part of the circuit board 9 is supported in a stable state, so it can adequately withstand the contact pressure of the connection probe on the device side that connected by contact with the positive terminal plate 4 disposed in the middle part of the circuit board 9.

With the structure of the present invention as described above, the connection pieces 11, 36, and 37 can consist of a PTC element, which allows the PTC element 17 provided on the circuit board 9 to be eliminated and thereby increases the available space on the circuit board 9, which is preferable for applications to smaller rechargeable batteries 10.

The rechargeable battery 10 in this embodiment is a lithium ion rechargeable battery in which the positive electrode input and output terminal 25 is used for the sealing assembly and the cell case 26 for the negative electrode input and output terminal, but it should go without saying that a rechargeable battery in which the negative electrode is on the sealing assembly side and the positive electrode on the cell case side is also acceptable, and that modifications may be made in the connections.

Next, a rechargeable battery equipped with a battery protection circuit (circuit protected cell B) according to the second embodiment will be described. The circuit protected cell B in the following embodiment comprises a flat-shaped lithium ion rechargeable battery as shown in FIGS. 1A and 1B, and a circuit board 109 which constitutes a protection circuit that protects against overcharging, overdischarging, and so forth, which is integrally attached to the battery as shown in FIGS. 9A, 9B, and 9C.

Figure 9B:
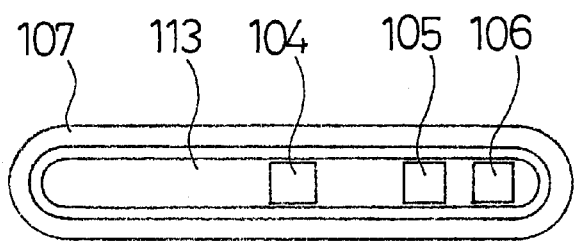
FIG. 9B is a plan view of the terminal layout on the top of this cell.
Figure 9A:
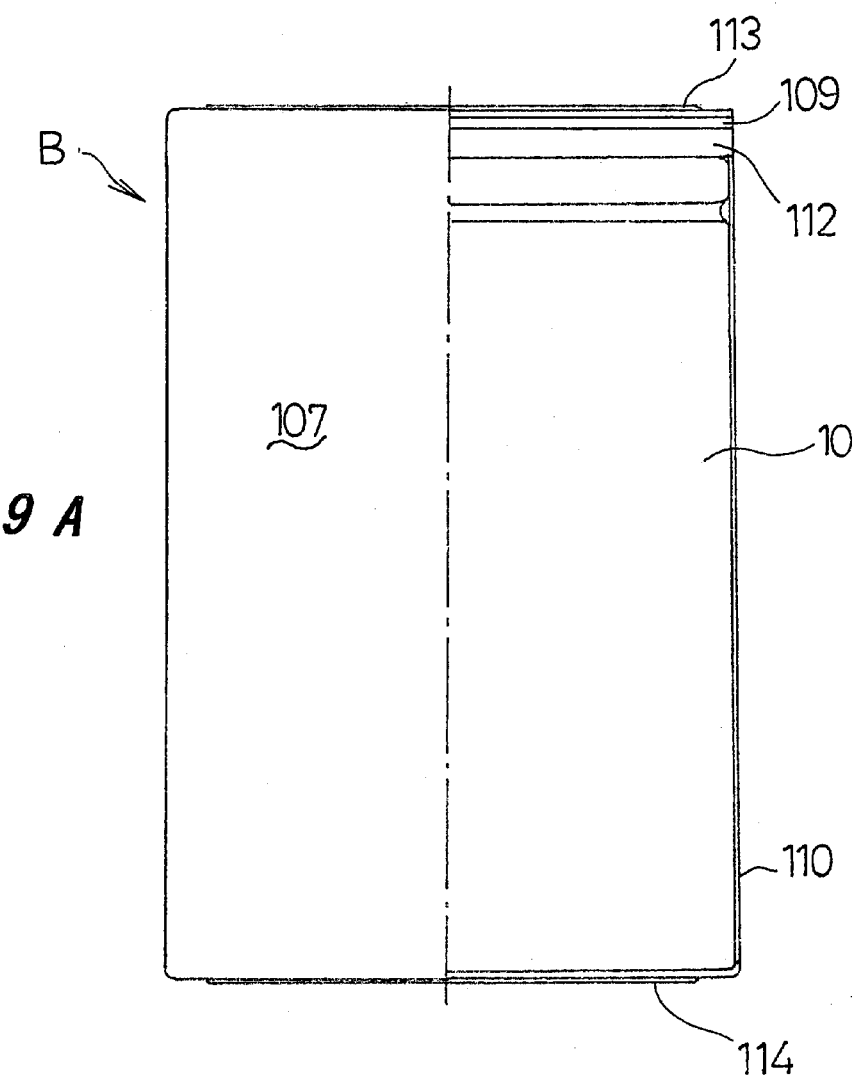
FIG. 9A is a side view of the structure of the rechargeable battery B equipped with a battery protection circuit according to a second embodiment, with half of the insulating label covering peeled away.
Figure 9C:
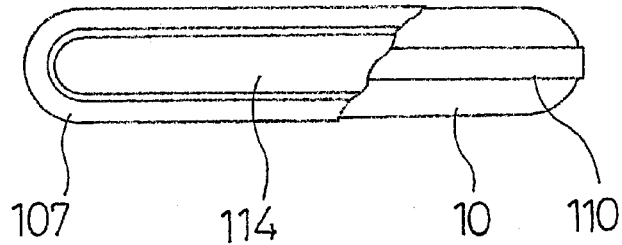
FIG. 9C is a plan view of the structure of the bottom surface.

In FIGS. 9A to 9C, the circuit protected cell B according to this embodiment has a positive terminal plate 104, a negative terminal plate 105, and a temperature sensing terminal plate 106 exposed on the outside of one end thereof, and everything other than this terminal portion is covered by an upper insulation board 113, a lower insulation board 114, and an insulating label 107. Inside, the rechargeable battery 10 and a circuit board 109 that constitutes a battery protection circuit are integrally incorporated.

Figure 10:
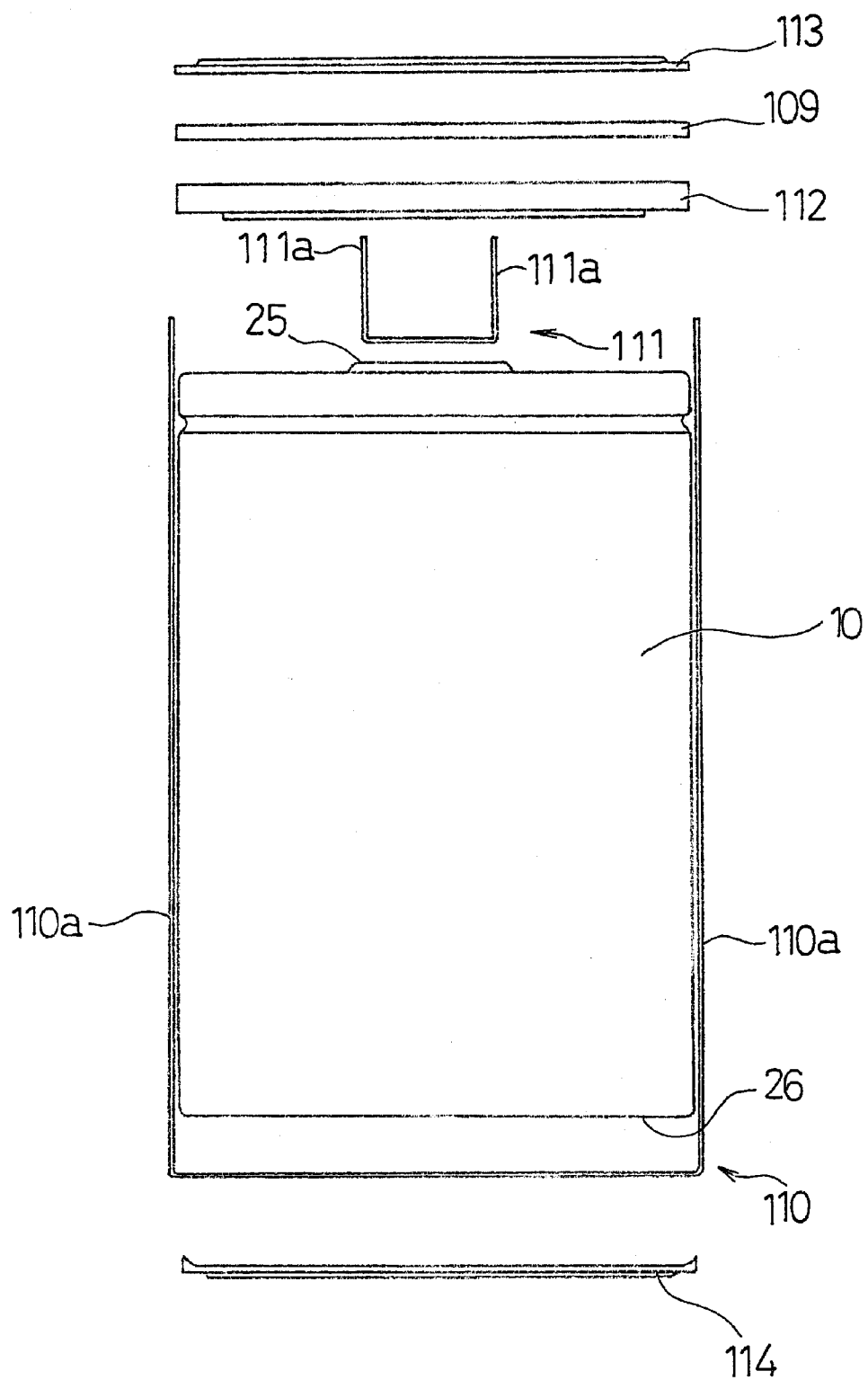
FIG. 10 is a side view of the assembly structure of rechargeable battery B in which the various constituent elements thereof are exploded.

FIG. 10 is an exploded view of the internal structure of the circuit protected cell B. On the sealing assembly side of the rechargeable battery 10 (structured as a lithium ion rechargeable battery) are disposed a connection piece 111 joined to the positive electrode input and output terminal (protruding terminal) 25 of this rechargeable battery 10; a spacer 112 that is disposed on the rechargeable battery 10 and provides a seat for the circuit board 109; a circuit board 109 that constitutes the battery protection circuit and has formed on it the positive terminal plate 104, the negative terminal plate 105, and the temperature sensing terminal plate 106; and the upper insulation board 113 that insulates and covers this circuit board 109 from above. On the bottom side of the rechargeable battery 10 there are disposed a lead plate 110 that is joined to the bottom surface of the rechargeable battery 10 and has a pair of leads 110a extending to the sealing assembly side, and the lower insulation board 114 that insulates and covers the bottom of the rechargeable battery 10.

Figure 11:
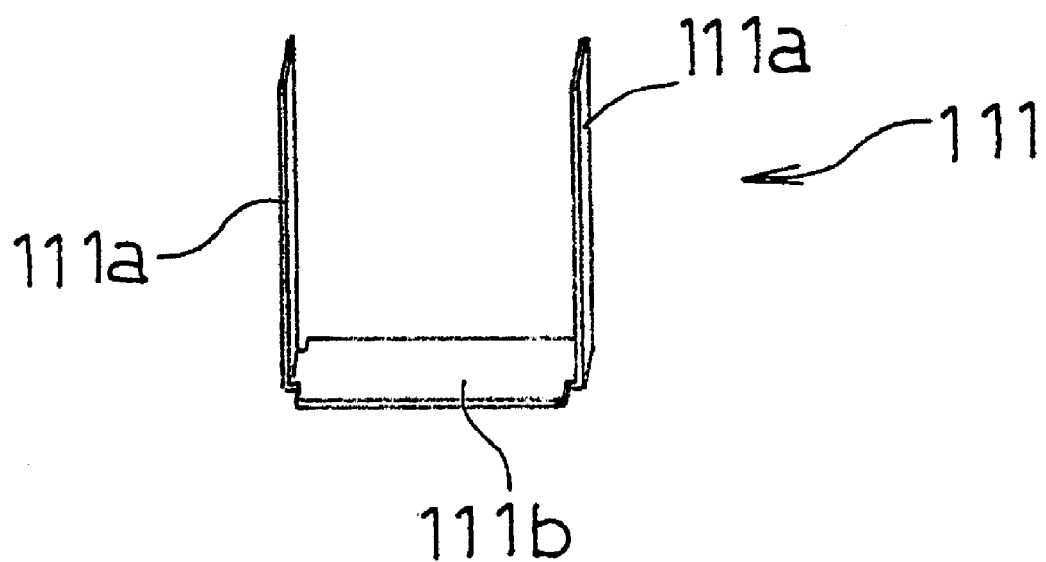
FIG. 11 is an oblique view of the structure of the connection piece.
Figure 12:
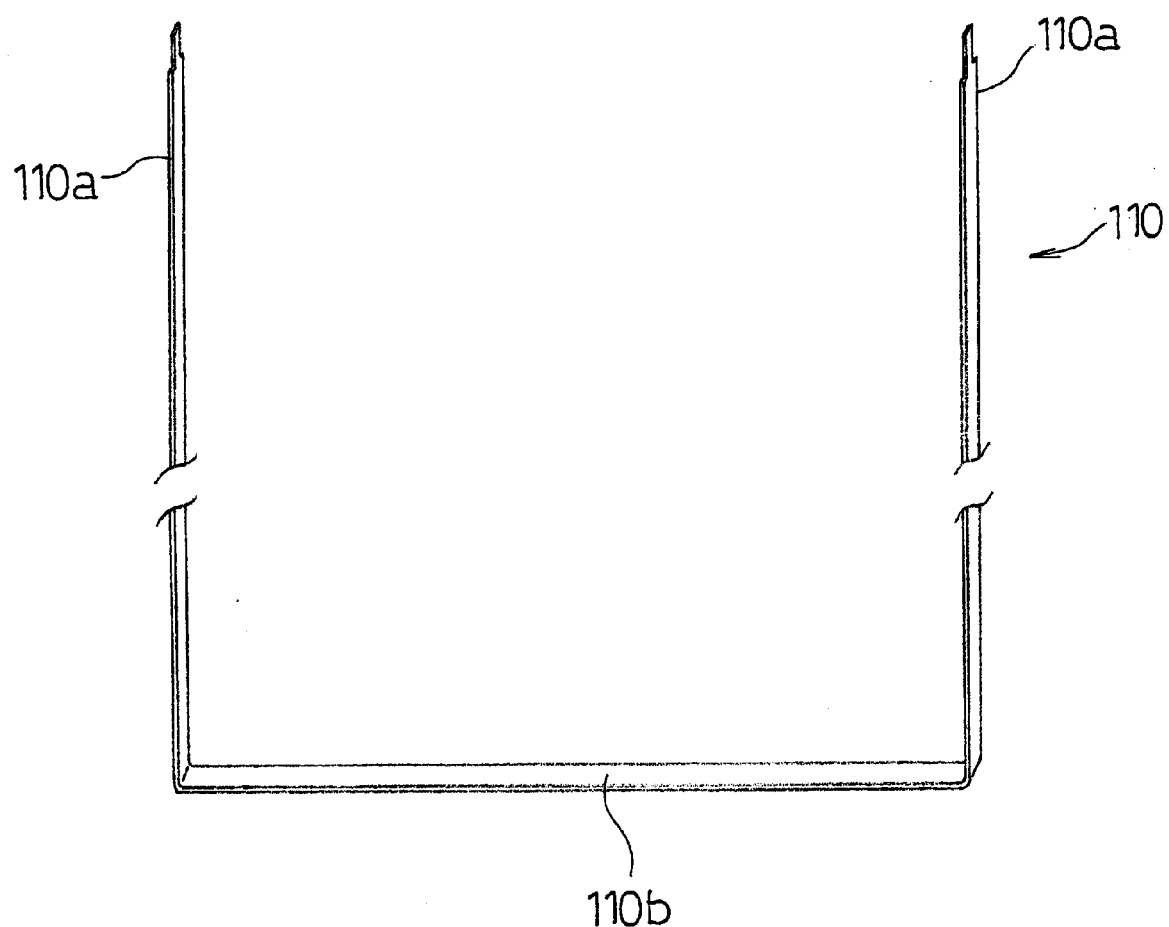
FIG. 12 is an oblique view of the structure of the lead plate.

As shown in FIG. 11, the connection piece 111, which is formed with a box section, consists of a base 111b and leads 111a. The base 111b is joined to the positive electrode input and output terminal 25 of the rechargeable battery 10. As shown in FIG. 12, the lead plate 110, which is also formed with a box section, consists of a base 110b and a pair of leads 110a. The base 110b is joined to the bottom surface of the cell case 26 of the rechargeable battery 10 as shown in FIG. 10. The pair of leads 110a extend along the sides of the cell case 26 toward the sealing assembly.

Figure 13A:
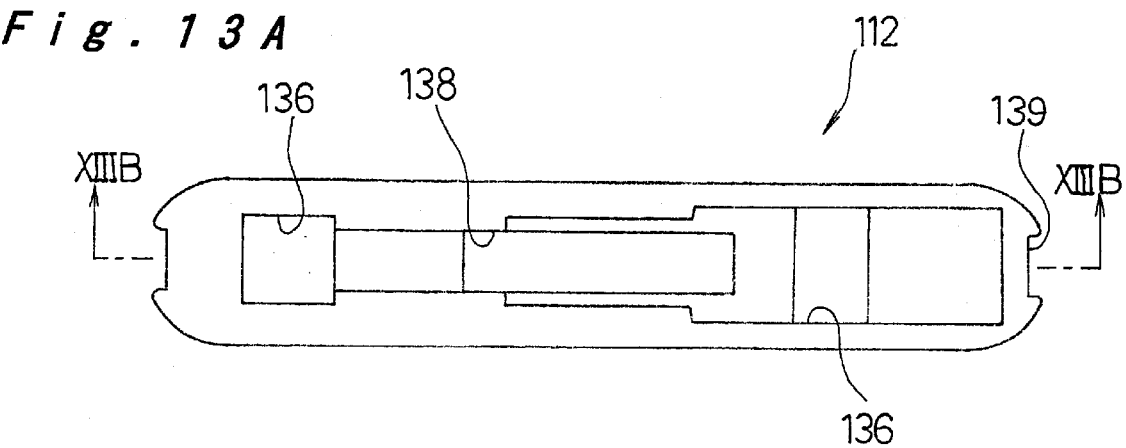
FIG. 13A is a plan view of the structure on the top side of the spacer.
Figure 13B:
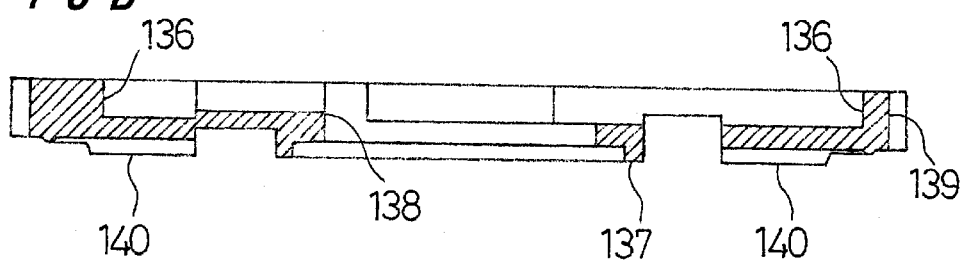
FIG. 13B is a cross section along the XIIIB—XIIIB line in FIG. 13A.
Figure 13C:
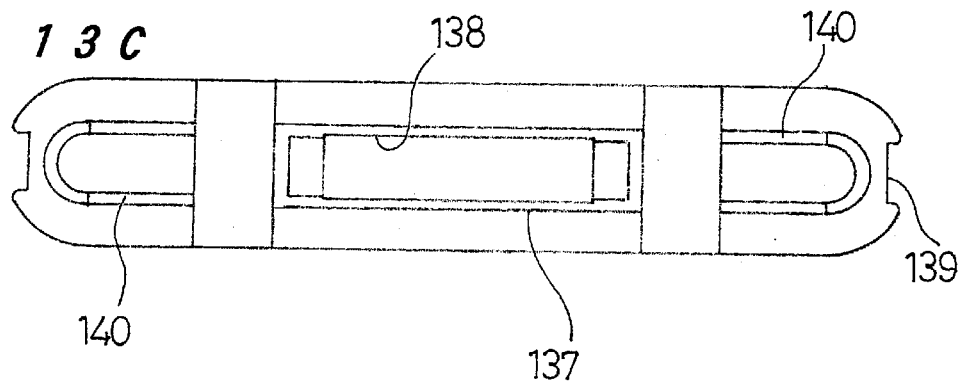
FIG. 13C is a plan view of the structure on the underside of the spacer.

The spacer 112, which is formed as shown in FIGS. 13A to 13C, is attached on the sealing assembly side of the rechargeable battery 10. As shown in FIG. 13C, a positioning lug 137 that mates with the positive electrode input and output terminal 25 of the rechargeable battery 10, and insertion lugs 140 that are inserted into recesses on the sealing assembly side of the rechargeable battery 10 are formed on the underside of the spacer 112, and these lugs are used to fit and position the spacer 112 on the rechargeable battery 10. This spacer 112 is coated with a UV adhesive agent, fitted on the sealing assembly side of the rechargeable battery 10, and fixed on the rechargeable battery 10 by curing the UV adhesive by ultraviolet irradiation. A connection piece hole 138 is made in the spacer 112, and the leads 111a of the connection piece 111 joined to the positive electrode input and output terminal 25 are passed through this connection piece hole 138. This spacer 112 forms a flat seat away from the rechargeable battery 10, and recesses 136 for accommodating the electronic parts mounted on the circuit board 109 are formed in this seat. Therefore, when the circuit board 109 is placed on the seat of the spacer 112, the electronic parts fit into the recesses 136, and the circuit board 109 is stacked up on the rechargeable battery 10 only in the thickness of its substrate, which minimizes the increase in volume caused by providing the battery protection circuit.

Figure 14A:
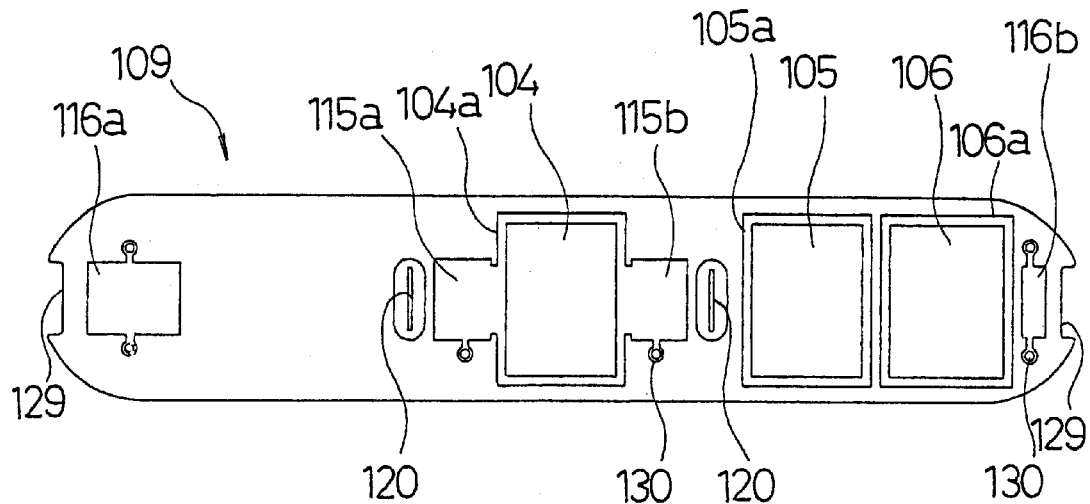
FIG. 14A is a plan view of the front of the circuit board.
Figure 14B:
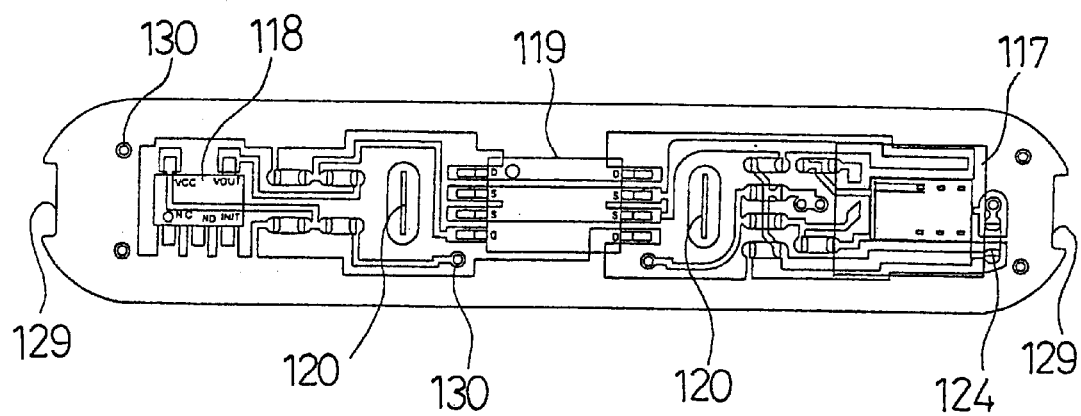
FIG. 14B is a plan view of the back of the circuit board.
Figure 15:
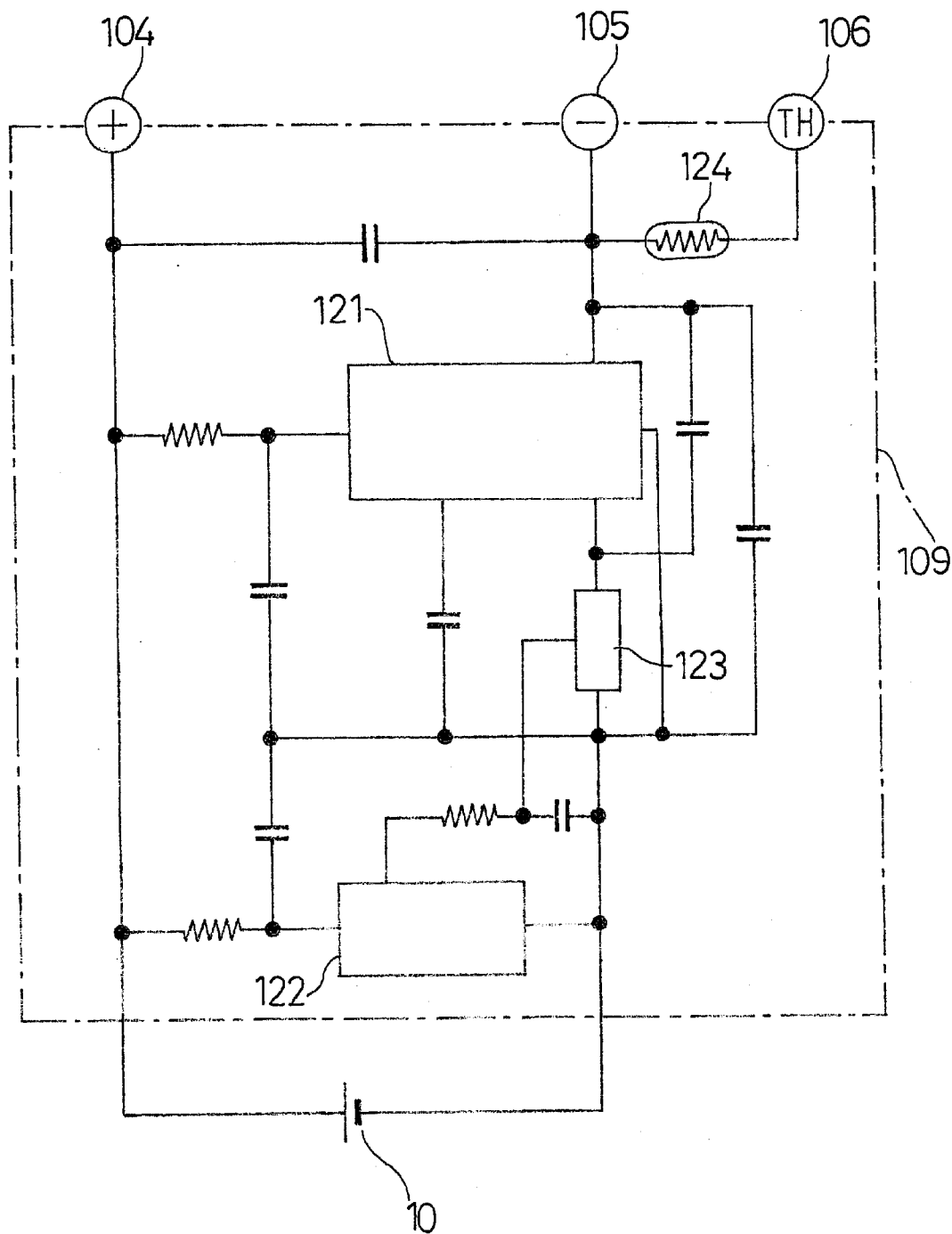
FIG. 15 is a circuit diagram illustrating the electrical structure of a rechargeable battery equipped with a battery protection circuit.

FIG. 14A shows the structure on the front of the circuit board 109, while FIG. 14B shows the structure on the back of the circuit board 109. The battery protection circuit shown in FIG. 15 is formed on the circuit board 109. As shown in FIG. 14B, the battery protection circuit is formed on the back of the circuit board 109, and as shown in FIG. 14A, on the front are formed the positive terminal plate 104, the negative terminal plate 105, the temperature sensing terminal plate 106, connection piece conductor patterns 115a and 115b for connecting the connection piece 111, and lead plate conductor patterns 116a and 116b for connecting the lead plate 110. The circuit patterns formed on the two sides are connected by through holes 130 where required. The pair of leads 111a of the connection piece 111 are passed through lead holes 120 formed in this circuit board 109, and the leads 111a are bent over and soldered on the connection piece conductor patterns 115a and 115b, respectively. The pair of leads 110a of the lead plate 110 are passed into lead plate notches 129 formed at both ends of the circuit board 109, and are bent over and soldered on lead plate conductor patterns 116a and 116b. This soldering of the respective pairs of leads 111a and 110a of the connection piece 111 and lead plate 110 fixes the circuit board 109 on the spacer 112.

The battery protection circuit shown in FIG. 15 is equipped with a main control circuit IC 121 for protecting the rechargeable battery 10 against overcharging, overdischarging, and excessive current. When voltage indicating a state of overcharging, overdischarging, or excessive current is detected, an FET (a switching element) incorporated in the IC is turned off and kept off by hysteresis until a specific release voltage is detected, and the input and output terminals of the rechargeable battery 10 are cut off to protect the rechargeable battery 10 from overcharging, overdischarging, and excessive current. While the input and output terminals are cut off due to overcharging, it is possible for power to flow in the discharge direction, and while the input and output circuits are cut off due to overdischarging, it is possible for power to flow in the charge direction. A sub-control circuit IC 122 for protecting the rechargeable battery 10 from overcharging is provided in addition to the main control circuit IC 121. During normal operation, the sub-control circuit IC 122 keeps the input and output circuits on by turning on a power MOSFET 123 connected in series with the input and output circuits. If the operation to prevent overcharging is not performed due to a malfunction in the main control circuit IC 121, the sub-control circuit IC 122 senses how far the overcharging has progressed, turns off the power MOSFET 123 to cut off the input and output circuits, keeps it off by hysteresis until a specific release voltage is detected, and prevents damage to the rechargeable battery 10 by overcharging. With this structure, the rechargeable battery 10 is protected redundantly from overcharging, which allows the rechargeable battery 10 which would be damaged particularly badly by overcharging to be protected by the battery protection circuit. Therefore, it is possible to eliminate the PTC element or current cut-off vent that used to be provided in a cell in order to protect the cell, and this structure is a favorable means for protection in the case of a small, thin rechargeable battery 10 as in this embodiment. More specifically, with a small, thin cell, it is difficult to find enough space to provide a PTC element or current cut-off vent, and if one is provided it reduces the volume of the positive and negative electrodes that serve as the elements for electromotive force, and the cell capacity has to be reduced and cell performance compromised, but this problem is eliminated with the structure in this embodiment. Also, if a PTC element is used as part of the battery protection circuit, it will take up more of the space in the battery protection circuit and make it difficult to produce a small cell, but the battery protection circuit of the present structure does not need to make use of a PTC element.

As shown in FIG. 14A, the positive terminal plate 104 is joined on a positive terminal conductor pattern 104a formed on the front of the circuit board 109, the negative terminal plate 105 is joined on a negative terminal conductor pattern 105a, and the temperature sensing terminal plate 106 is joined on a temperature sensing terminal conductor pattern 106a. These terminals have superior electroconductivity, joinability, and corrosion resistance because they are made from a sheet of copper-nickel alloy, a clad material comprising a sheet of copper-nickel alloy and stainless steel, or the like. The terminals need not be joined as sheets, and the various conductor patterns can instead themselves be utilized directly as terminals.

Figure 16:
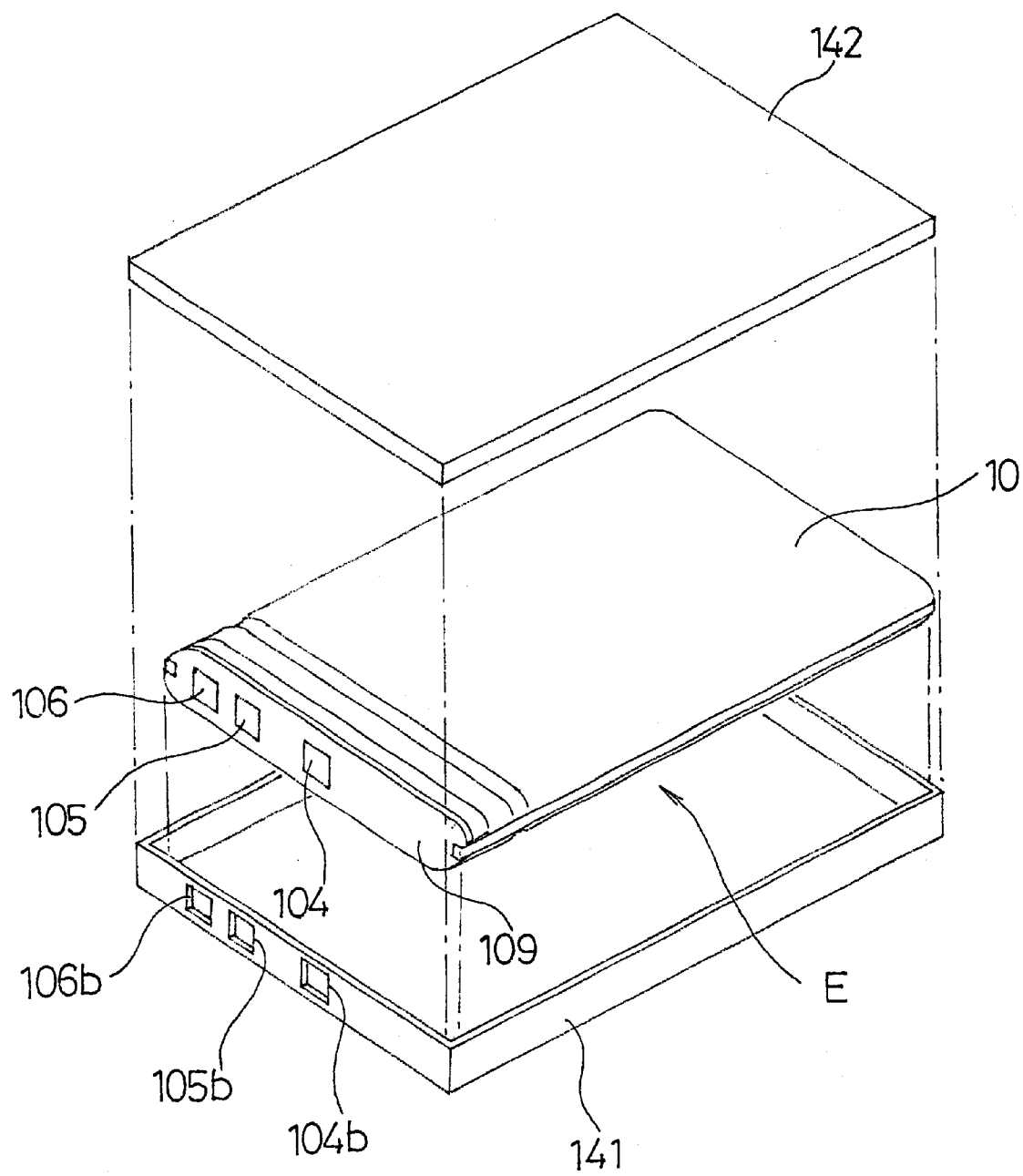
FIG. 16 is an oblique view of an example in which a cell with a battery protection circuit is produced in the form of a battery pack.

As described above, the result of mounting the spacer 112 and the circuit board 109 on the rechargeable battery 10 is that the rechargeable battery 10 is connected to the battery protection circuit formed on the circuit board 109, as shown in the circuit diagram in FIG. 15. The input and output of the rechargeable battery 10 go through this battery protection circuit, resulting in a circuit protected cell E as shown in FIG. 16. This circuit protected cell E can be housed in a lower case 141 having formed in it a positive terminal window 104b, a negative terminal window 105b, and a temperature sensing terminal window 106b as shown in FIG. 16, and when the lower case 141 is closed with an upper case 142, the resulting configuration is a battery pack.

The circuit protected cell E is subjected to the processing described below in order to obtain the configuration of the circuit protected cell illustrated in FIGS. 9A to 9C. Just as shown in FIG. 10, the upper insulation board 113 is disposed on top of the circuit board 109, the lower insulation board 114 is disposed on the bottom of the rechargeable battery 10, and the insulating label 107 covers the entire side peripheral surface, including the area around the upper insulation board 113 and the lower insulation board 114, resulting in the same configuration as the circuit protected cell illustrated in FIGS. 9A to 9C.

Figure 17A:
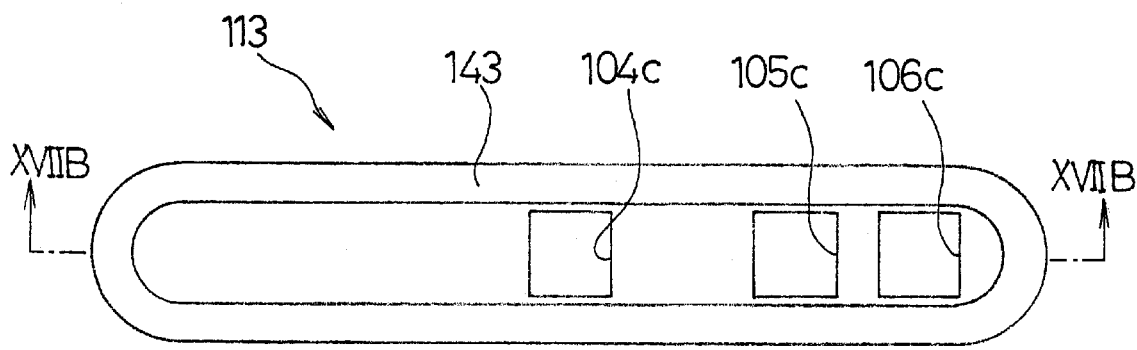
FIG. 17A is a plan view of the structure on the top side of the upper insulation board.
Figure 17B:
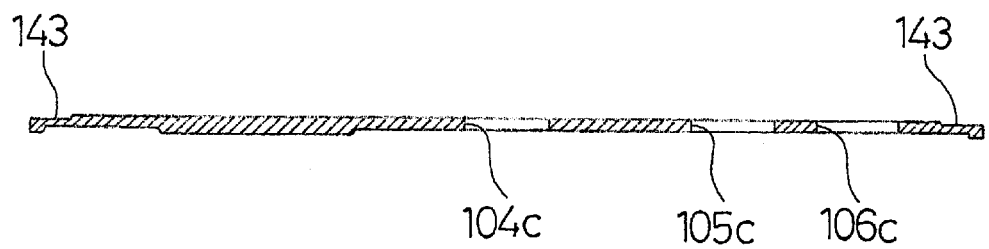
FIG. 17B is a cross section along the XVIIB—XVIIB line in FIG. 17A.
Figure 17C:
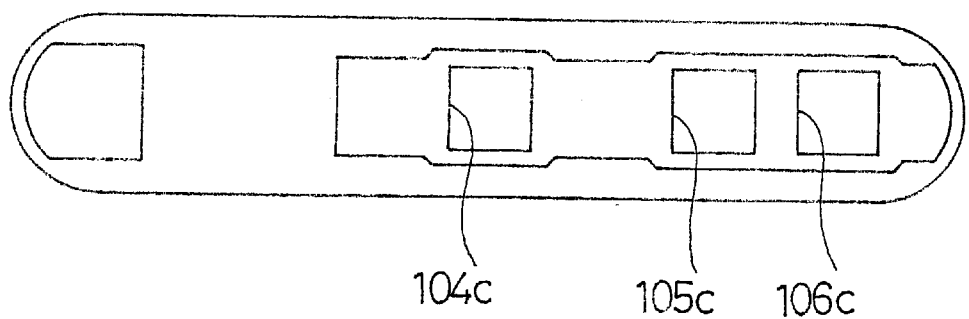
FIG. 17C is a plan view of the structure on the underside of the upper insulation board.
Figure 18A:
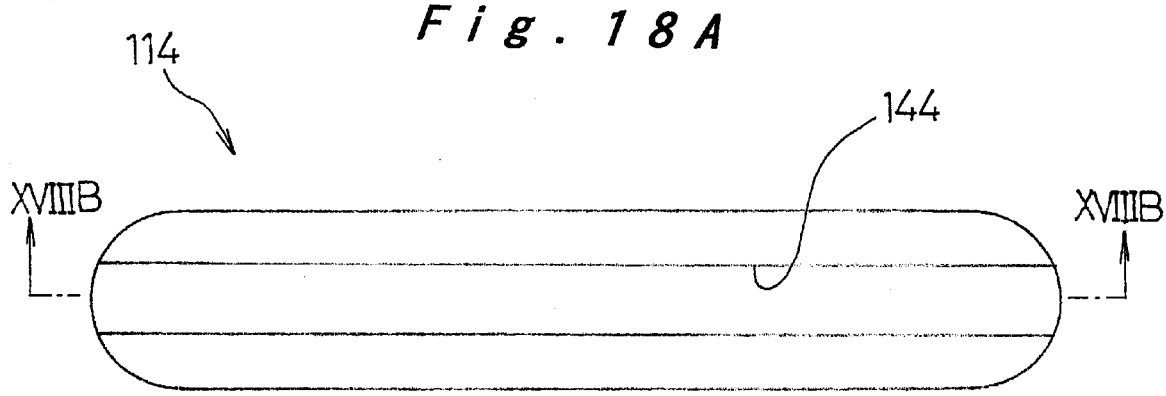
FIG. 18A is a plan view of the structure on the top side of the lower insulation board.
Figure 18B:
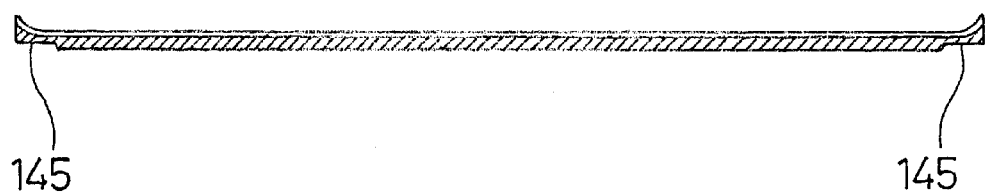
FIG. 18B is a cross section along the XVIIIB—XVIIIB line in FIG. 18A.
Figure 18C:
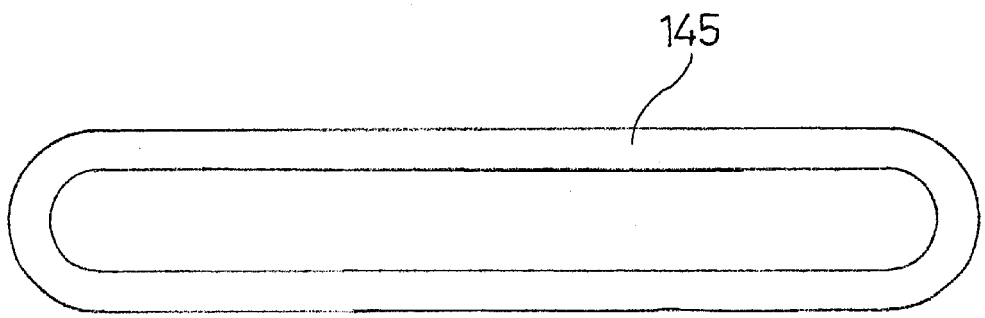
FIG. 18C is a plan view of the structure on the underside of the lower insulation board.

As shown in FIGS. 17A, 17B, and 17C, the upper insulation board 113 has formed in it a positive terminal window 104c at a location corresponding to the positive terminal plate 104 provided to the circuit board 109, a negative terminal window 105c at a location corresponding to the negative terminal plate 105, and a temperature sensing terminal window 106c at a location corresponding to the temperature sensing terminal plate 106, around which is formed a step 143 covering the edge of the insulating label 107. As shown in FIGS. 18A, 18B, and 18C, a lead groove 144 for accommodating the lead plate 110 is formed on the inner surface side of the lower insulation board 114, and a curved surface matching the shape of the bottom surface of the rechargeable battery 10 is formed around this. As shown in FIG. 18C, a step 145 covering the edge of the insulating label 107 is formed around the outer periphery.

The insulating label 107 is formed by applying an adhesive to a heat-shrinkable sheet. At the same time it is stuck onto the various constituent members, it is heat-shrunk so as to cover these members, thereby integrating the parts. A design can be printed on the surface of this insulating label 107, which allows the outer shell to have an attractive appearance and also allows usage instructions, warnings, or the like to be indicated.

As shown in FIGS. 9A to 9C, with a rechargeable battery equipped with a battery protection circuit structured as above, the battery protection circuit can be housed internally merely by extending the height of the rechargeable battery 10 a small amount, and when this cell is installed in a device, reliability is higher since the rechargeable battery itself has a battery protection function. Also, the positive terminal 104, the negative terminal 105, and the temperature sensing terminal 106 are disposed asymmetrically to the left and right on the top, which prevents the cell from being installed backwards in the device.

The main application for the flat-shaped rechargeable battery 10 is as a power source for small, portable electronic devices, and increasing the thickness sacrifices the advantages of the flat shape, but with the present structure, a battery protection circuit can be provided without increasing the thickness of the rechargeable battery 10, with the final configuration being not a battery pack, but a smaller, more lightweight rechargeable battery equipped with a battery protection circuit, which helps make compact, portable electronic devices smaller and more lightweight.

A thermistor 124 is connected to the temperature sensing terminal 106, and this thermistor 124 is disposed at a location close to the main control circuit IC 121 of the circuit board 109 toward the rechargeable battery 10. The thermistor 124 varies its resistance by reacting to the temperature of the rechargeable battery 10 and the main control circuit IC 121, so when it is connected to the temperature sensing terminal plate 106 with the device in which this rechargeable battery equipped with a battery protection circuit is used, the temperature is monitored to deal with any abnormal increases in temperature.

Next, the rechargeable battery equipped with a battery protection circuit (circuit protected cell C) according to the third embodiment will be described.

Figure 19:
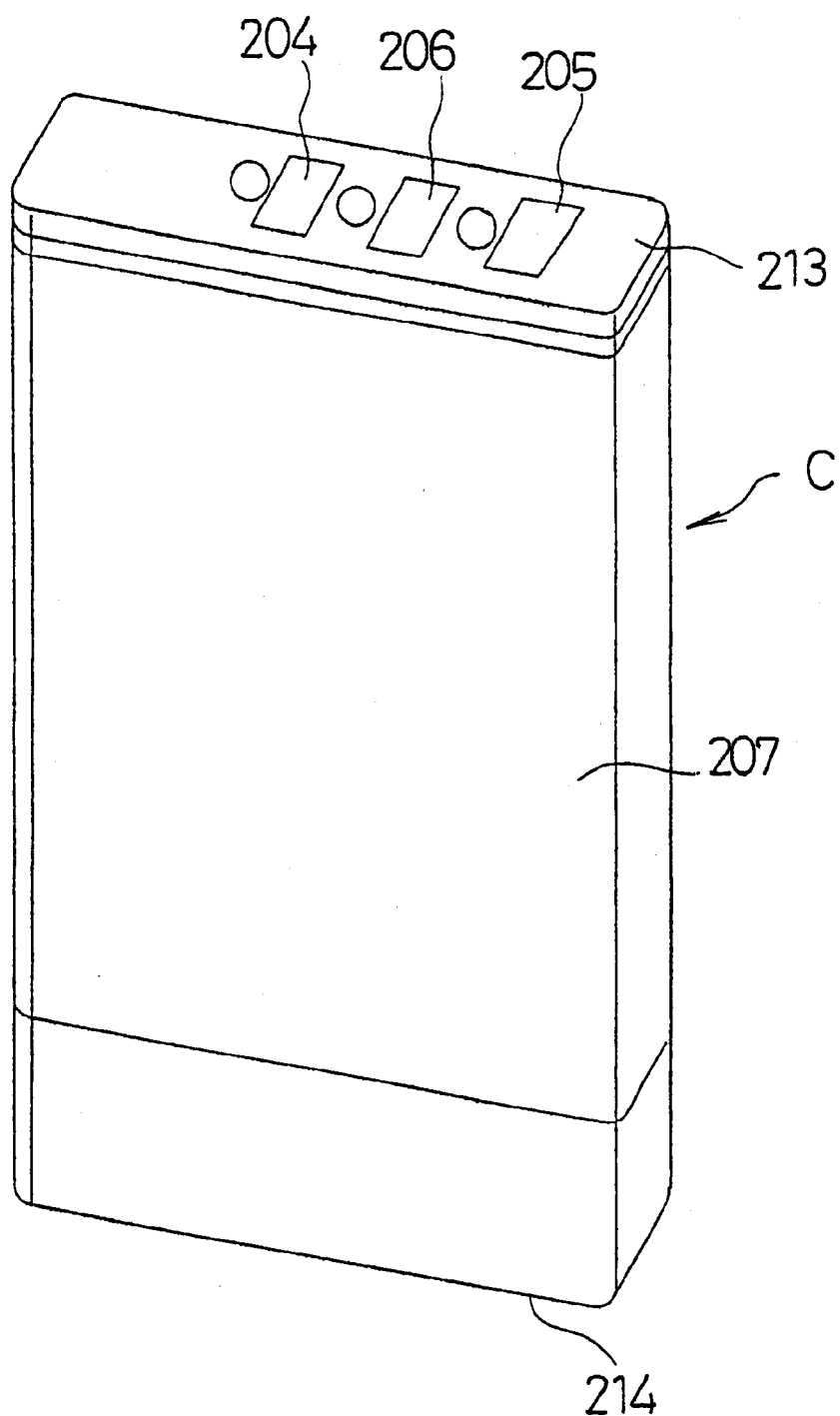
FIG. 19 is an oblique view of the rechargeable battery C equipped with a battery protection circuit according to a third embodiment.

In FIG. 19, the circuit protected cell C according to this embodiment has a positive terminal 204, a negative terminal 205, and a temperature sensing terminal 206 exposed to the outside at one end, and other than these terminal portions, everything is covered by an upper insulating holder 213, a lower insulating holder 214, and an insulating sheet 207, inside of which the rechargeable battery 10 and the circuit board 209 on which the battery protection circuit is formed are integrally incorporated.

Figure 20:
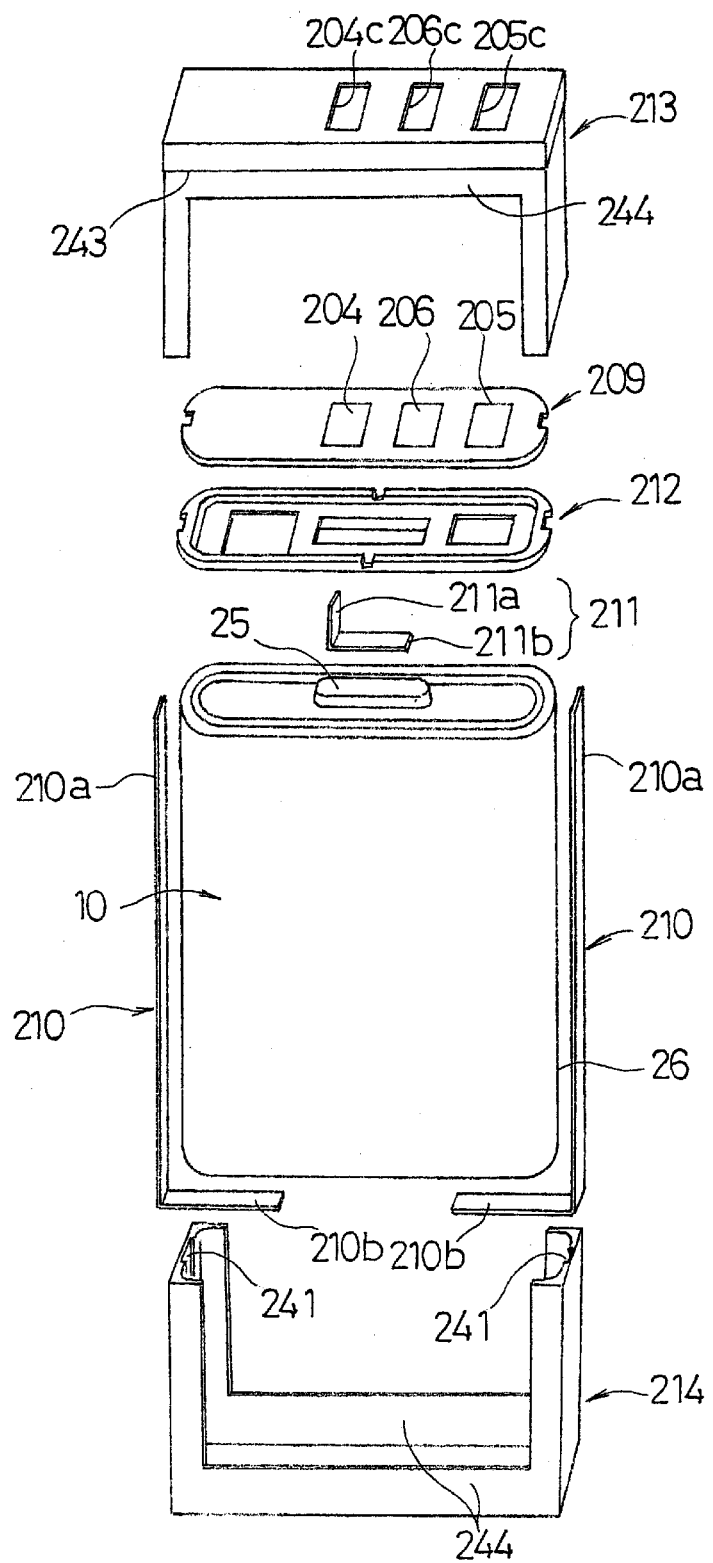
FIG. 20 is an oblique view of the assembly structure of rechargeable battery C in which the various constituent elements thereof are exploded.

FIG. 20 is an exploded view of the internal structure of the circuit protected cell C. On the sealing assembly side of the rechargeable battery 10 (structured as a lithium ion rechargeable battery) are disposed a connection piece 211 joined to the positive electrode input and output terminal (protruding terminal) 25 of the rechargeable battery 10; a spacer 212 that is disposed on the rechargeable battery 10 and provides a seat for the circuit board 209; a circuit board 209 that constitutes the battery protection circuit and has formed on it the positive terminal 204, the negative terminal 205, and the temperature sensing terminal 206; and the upper insulation board 213 that insulates and covers the top side. On the bottom side of the rechargeable battery 10 are disposed a pair of lead plates 210 whose bases 210b are joined to the bottom surface of the rechargeable battery 10 and whose leads 210a extend to the sealing assembly side, and the lower insulation board 214 that insulates and covers the bottom side.

The base 211b of the L-shaped connection piece 211 is joined to the positive electrode input and output terminal 25 of the rechargeable battery 10. The bases 210b of the pair of lead plates 210 are joined to the bottom surface of the cell case 26, and the pair of leads 210a extend along the sides of the cell case 26 toward the sealing assembly.

Figure 21A:
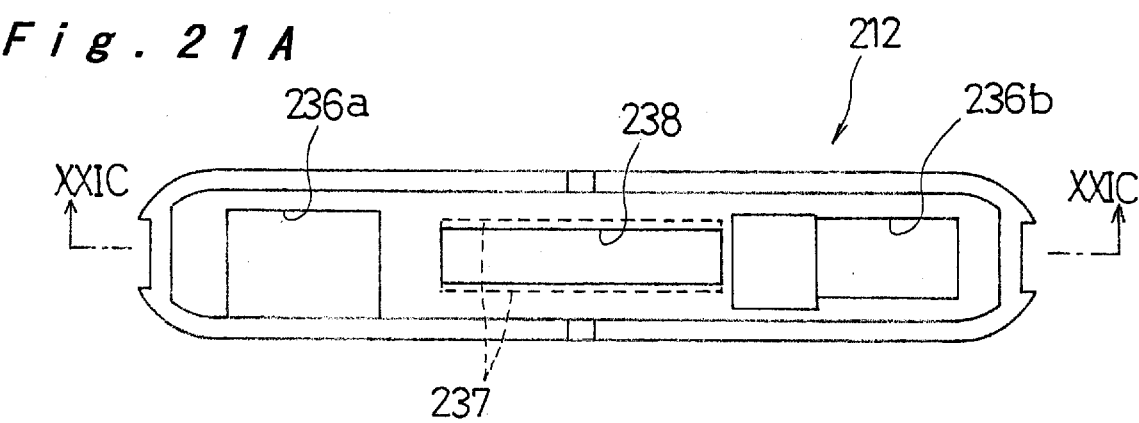
FIG. 21A is a plan view of the structure on the top side of the spacer.
Figure 21B:
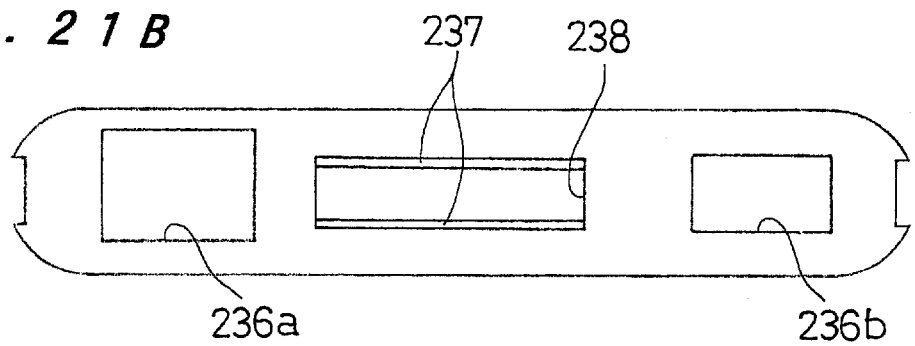
FIG. 21B is a plan view of the structure on the underside of the spacer.
Figure 21C:
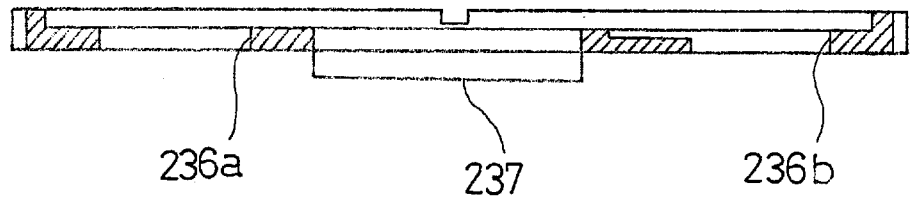
FIG. 21C is a cross section along the XXIC—XXIC line in FIG. 21A.

The spacer 212, which is formed as shown in FIGS. 21A to 21C, is attached on the sealing assembly side of the rechargeable battery 10. As shown in FIG. 21B, a pair of positioning lugs 237 that hit the long side surfaces of the rectangularly formed positive electrode input and output terminal 25 are formed on the underside (the rechargeable battery 10 side) of the spacer 212, and these are disposed on the sealing assembly so as to mate with the positive electrode input and output terminal 25, the result of which is that the spacer 212 is positioned to fit over the rechargeable battery 10, and insulation from the cell case 26 serving as the negative electrode is improved.

A connection piece hole 238 between the pair of positioning lugs 237 allows the lead 211a of the connection piece 211 joined to the positive electrode input and output terminal 25 to be passed through to the top surface. The spacer 212 forms a seat insulated from the rechargeable battery 10, and in this seat are formed openings 236a and 236b that accommodate the electronic parts mounted on the sealing assembly side of the circuit board 209. When the circuit board 209 is placed on this seat, the electronic parts mounted on the sealing assembly side fit into the openings 236a and 236b, so the circuit board 209 is stacked up on the rechargeable battery 10 only in a height equal to the thickness of its substrate and the thickness of the spacer 212, which minimizes the increase in height caused by providing the battery protection circuit.

Figure 23:
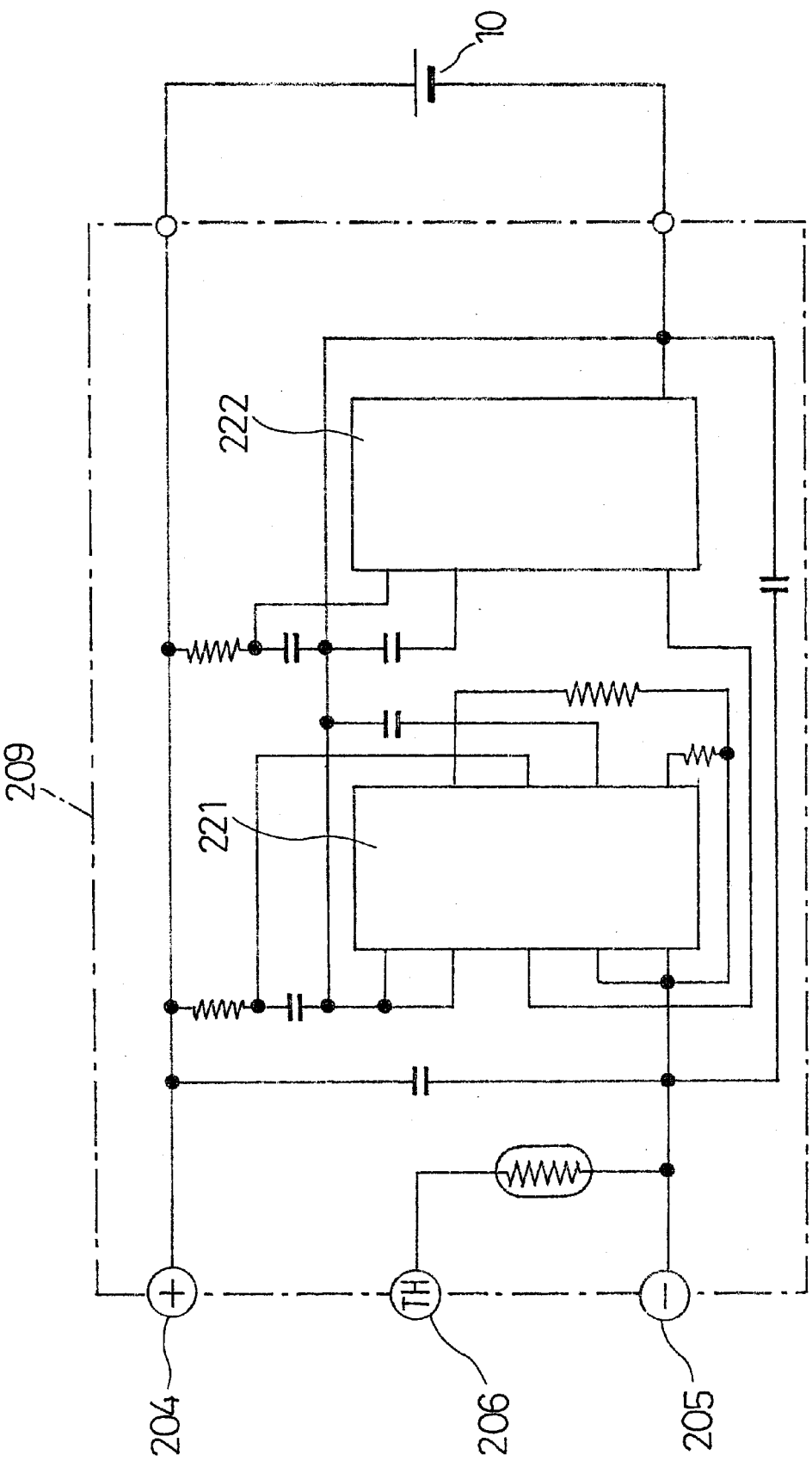
FIG. 23 is a circuit diagram illustrating the electrical structure of a rechargeable battery equipped with a battery protection circuit.

FIGS. 22A and 22B show in see-through fashion the conductor patterns formed on the front and back of the circuit board 209 and the electronic parts mounted thereon, in which the battery protection circuit and input and output circuits shown in FIG. 23 are formed on a substrate. As shown in FIG. 22B, a battery protection circuit in which IC parts 221 and 222 and chip parts 226 are mounted is formed on the back of the circuit board 209. As shown in FIG. 22A, on the front are formed the positive terminal 204, the negative terminal 205, the temperature sensing terminal 206, a connection piece conductor pattern 215 for connecting the connection piece 211, and lead plate conductor patterns 216a and 216b for connecting the lead plates 210. The circuit patterns formed on the two sides are connected by through holes 230 where required.

The leads 211a of the connection piece 211 are passed through lead holes 220 formed in this circuit board 209, and the leads 211a are bent over and soldered on the connection piece conductor pattern 215. The leads 210a of the pair of lead plates 210 are passed into lead plate notches 229 formed at both ends of the circuit board 209, and are bent over and soldered on the lead plate conductor patterns 216a and 216b. This soldering of the connection piece 211 and lead plates 210 fixes the circuit board 209 on the spacer 212.

The battery protection circuit shown in FIG. 23 is equipped with the main control circuit 221 for protecting the rechargeable battery 10 against overcharging, overdischarging, and excessive current. When voltage indicating a state of overcharging, overdischarging, or excessive current is detected, a switching device incorporated in the IC is turned off and.kept off by hysteresis until a specific release voltage is detected, and the input and output circuits of the rechargeable battery 10 are cut off to protect the rechargeable battery 10 from overcharging, overdischarging, and excessive current. While the input and output circuits are cut off due to overcharging, it is possible for power to flow in the discharge direction, and while the input and output circuits are cut off due to overdischarging, it is possible for power to flow in the charge direction. A sub-control circuit IC 222 for protecting the rechargeable battery 10 from overcharging is provided in addition to the main control circuit IC 221. During normal operation, the sub-control circuit IC 222 keeps the input and output circuits on by turning on a switching device incorporated into the IC. If the operation to prevent overcharging is not performed due to a malfunction in the main control circuit IC 221, the sub-control circuit IC 222 senses how far the overcharging has progressed, turns off the switching device to cut off the input and output circuits, keeps it off by hysteresis until a specific release voltage is detected, and prevents damage to the rechargeable battery 10 by overcharging. With this structure, the rechargeable battery 10 is protected redundantly from overcharging, which allows the rechargeable battery 10 which would be damaged particularly badly by overcharging to be protected by the battery protection circuit. Therefore, it is possible to eliminate the PTC element or current cut-off vent that used to be provided in a cell in order to protect the cell, and this structure is a favorable means for protection in the case of a small, thin rechargeable battery 10 as in this embodiment. More specifically, with a small, thin cell, it is difficult to find enough space to provide a PTC element or current cut-off vent, and if one is provided it reduces the volume of the positive and negative electrodes that serve as the elements for electromotive force, and the cell capacity has to be reduced and cell performance compromised, but this problem is eliminated with the structure in this embodiment. Also, if a PTC element is used as part of the battery protection circuit, it will take up more of the space in the battery protection circuit and make it difficult to produce a small cell, but the battery protection circuit of the present structure does not need to make use of a PTC element.

With the circuit board 209 on which this battery protection circuit is formed, as shown in FIG. 22B, a main ground pattern 219 connected via through holes 230 from the lead plate conductor pattern 216b to which one of the pair of lead plates 210 is connected is not directly connected to a sub-ground pattern 218 connected via the through holes 230 from the lead plate conductor pattern 216a to which the other lead plate 210 is connected. This circuit structure avoids the formation of a closed circuit in which the pair of lead plates 210 whose bases 210b are joined to the cell case 26 are linked by the conductor pattern on the circuit board 209. If a closed circuit is formed, the cell will be more susceptible to noise and the like from the device in which it is used, but malfunction due to noise or the like can be prevented by employing the above structure in which no closed circuit is formed.

As shown in FIG. 22A, the positive terminal 204 is joined on a positive terminal conductor pattern 204a formed on the front of the circuit board 209, the negative terminal 205 is joined on a negative terminal conductor pattern 205a, and the temperature sensing terminal 206 is joined on a temperature sensing terminal conductor pattern 206a. These terminals have superior electroconductivity, joinability, and corrosion resistance because they are made from a sheet of copper-nickel alloy, a clad material comprising a sheet of copper-nickel alloy and stainless steel, or the like. The terminals need not be joined as sheets, and the various conductor patterns can instead be metal plated and utilized directly as terminals.

After the circuit board 209 has been attached as above to the rechargeable battery 10, as shown in FIG. 20 the upper insulating holder 213 is disposed on top of the circuit board 209, the lower insulating holder 214 is disposed on the bottom of the rechargeable battery 10, and the insulating label 207 covers the entire side peripheral surface, including the area around the upper insulation holder 213 and the lower insulation holder 214, thereby completing the circuit protected cell C configured as shown in FIG. 19.

As shown in FIG. 20, the upper insulating holder 213 has formed in it a positive terminal window 204c at a location corresponding to the positive terminal 204 provided to the circuit board 209, a negative terminal window 205c at a location corresponding to the negative terminal 205, and a temperature sensing terminal window 206c at a location corresponding to the temperature sensing terminal 206, around which is formed a step 243 covering the edge of the insulating label 207. As shown in FIG. 20, lead grooves 241 for accommodating the lead plate 210 are formed on the inner surface sides of the upper insulating holder 213 and the lower insulating holder 214.

The upper insulating holder 213 and the lower insulating holder 214 can respectively be modified as shown in FIGS. 24A to 24E and FIGS. 25A to 25E. That is, they can be open at locations corresponding to the lead plates 210, and be divided into extensions 213a and 214a, respectively, which affords a reduction in the width of the upper insulating holder 213 and lower insulating holder 214, and allows the overall size to be smaller. Also, if linking notches 213b and 214b that fit together are provided at the abutting distal ends of the extensions 213a and 214a, respectively, then the upper insulating holder 213 and the lower insulating holder 214 will be securely linked together. Furthermore, the upper insulating holder 213 and the lower insulating holder 214 can be securely linked together by providing tabs 248 and openings 249 that fit together to the linking notches 213b and 214b, respectively, so that the upper insulating holder 213 and the lower insulating holder 214 can be engaged.

If, as shown in FIG. 20, covering components 244 that cover the upper and lower parts of the long side surfaces of the rechargeable battery 10 are formed on the upper insulating holder 213 and the lower insulating holder 214, it will be easier to fit these holders onto the rechargeable battery 10 and easier to wrap the insulating sheet 207 around it. These covering components 244 can also be provided in the structures shown in FIGS. 24A to 24E and FIGS. 25A to 25E, and since the side surfaces of the rechargeable battery 10 are not entirely covered, there will be room for the cell case 26 to expand, which minimizes changes in the overall thickness in the event that swelling should occur. The rechargeable battery 10 generates gas through high-temperature discharge in a fully charged state or repeated charging and discharging, and the mechanically weak middle section of the cell case 26 has a tendency to swell, but since this swelling is absorbed within the thickness of the covering components 244, the adverse effects caused by changes in the thickness of the rechargeable battery 10 are avoided.

After the upper insulating holder 213 and the lower insulating holder 214 have been attached to the rechargeable battery 10 as above, the insulating sheet 207 is stuck to the peripheral side surface from the step 243 of the upper insulating holder 213 and below. The insulating sheet 207 is formed by applying an adhesive to a heat-shrinkable sheet. At the same time it is stuck onto the various constituent members, it is heat-shrunk so as to cover these members, thereby integrating the parts. A design can be printed on the surface of this insulating label 207, which allows the outer shell to have an attractive appearance and also allows usage instructions, warnings, or the like to be indicated.

As shown in FIG. 19, with a rechargeable battery equipped with a battery protection circuit structured as above, the battery protection circuit can be housed internally merely by extending the height of the rechargeable battery 10 a small amount, and when this cell is installed in a device, reliability is higher since the rechargeable battery itself has a battery protection function. Also, the positive terminal 204, the negative terminal 205, and the temperature sensing terminal 206 are disposed asymmetrically to the left and right on the top, which prevents the cell from being installed backwards in the device.

The rechargeable battery 10 in this embodiment has been described, as one example, as a lithium ion rechargeable battery in which the positive electrode input and output terminal 25 is used for the sealing assembly and the cell case 26 for the negative electrode input and output terminal, but it should go without saying that a rechargeable battery in which the negative electrode is on the sealing assembly side and the positive electrode on the cell case side is also acceptable, and that modifications may be made in the connections.

Next, a rechargeable battery equipped with a battery protection circuit (circuit protected cell D) according to a fourth embodiment will be described.

Figure 26:
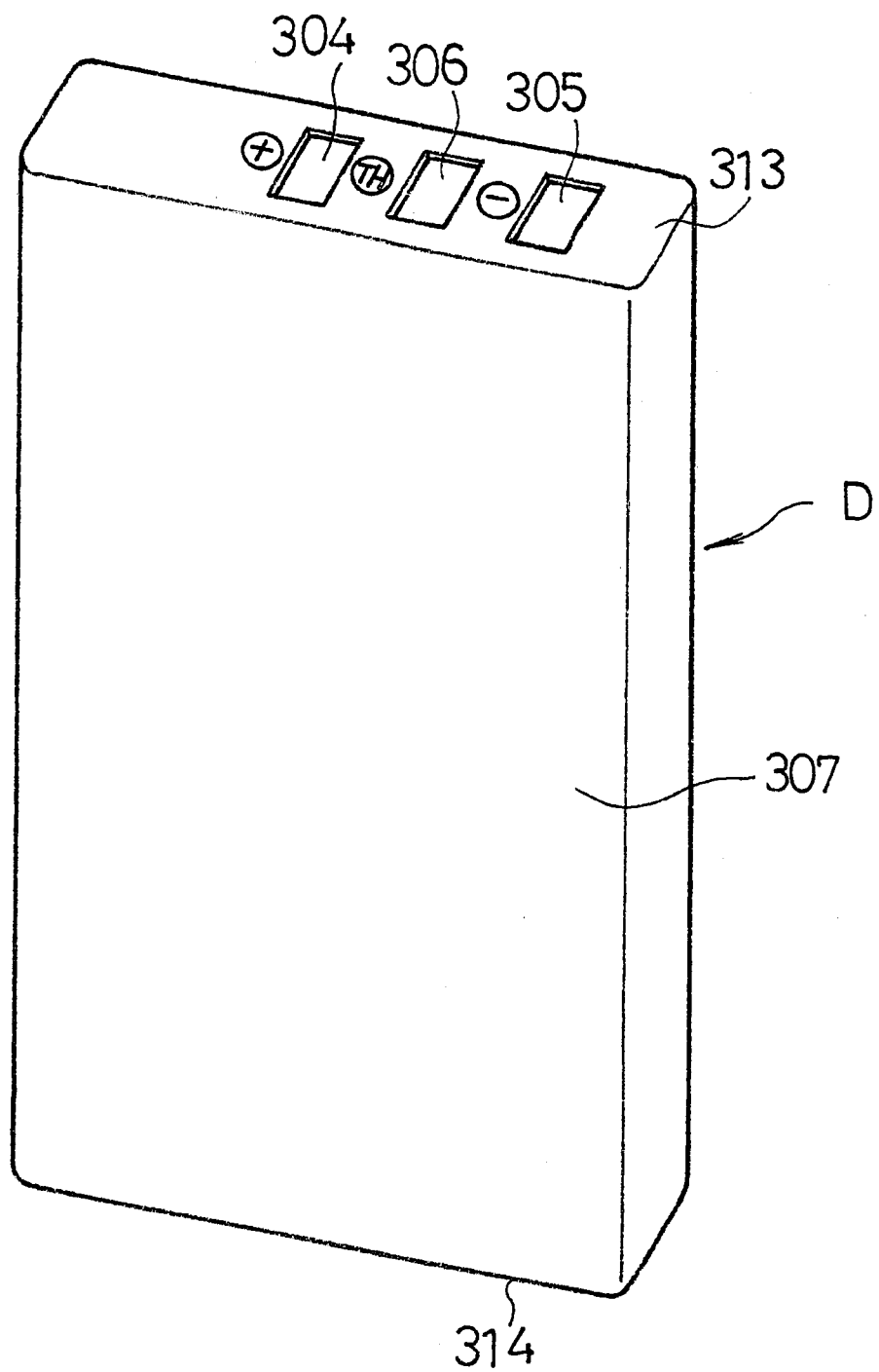
FIG. 26 is an oblique view of the rechargeable battery D equipped with a battery protection circuit according to a third embodiment.

In FIG. 26, the circuit protected cell D according to this embodiment is such that the rechargeable battery 10 and a circuit board 309 on which a battery protection circuit is formed are housed in an outer case 307 formed by resin molding, and a positive terminal 304, a negative terminal 305, and a temperature sensing terminal 306 are exposed to the outside at one end.

Figure 27:
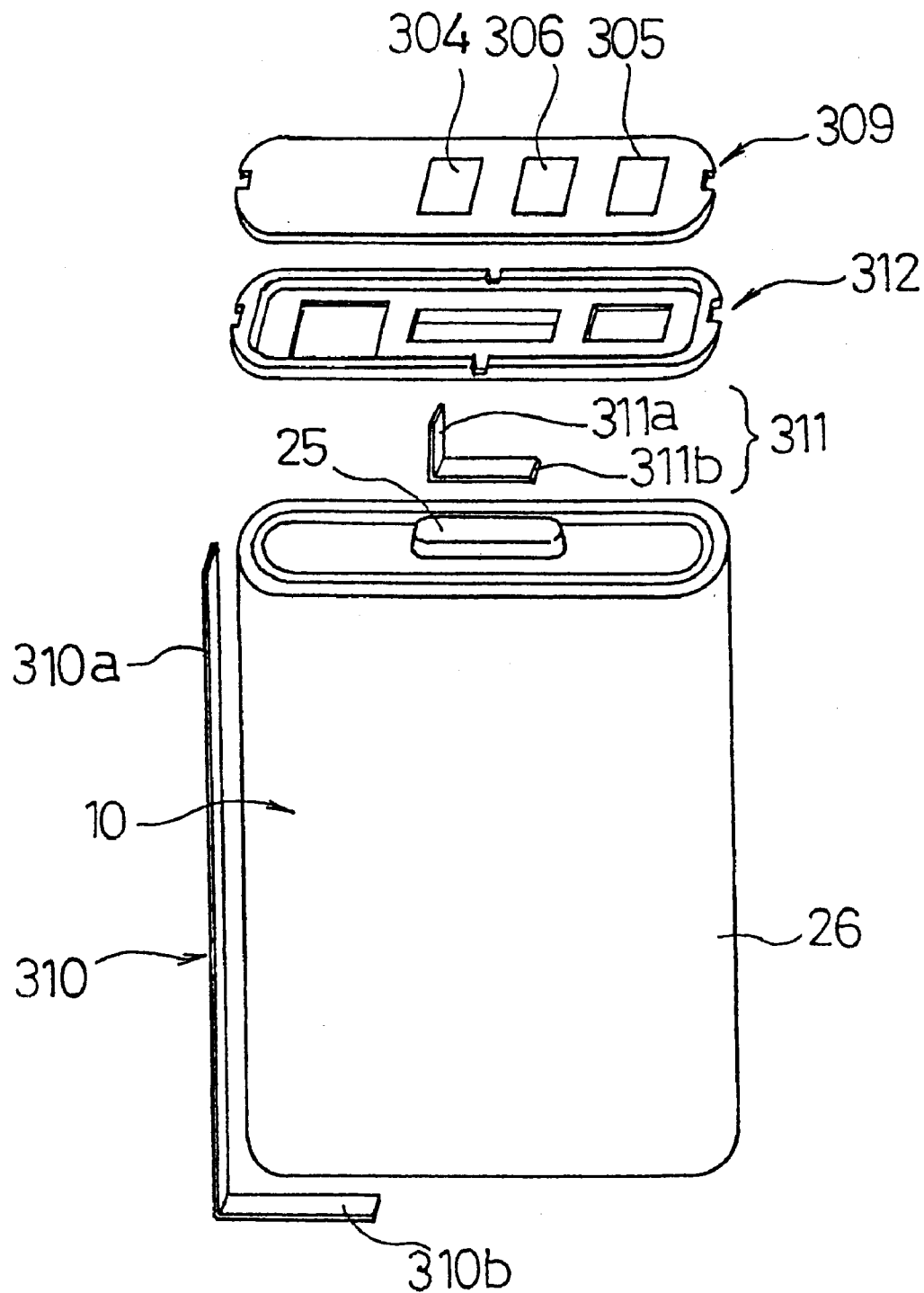
FIG. 27 is an oblique view of the assembly structure of rechargeable battery D in which the various constituent elements thereof are exploded.

FIG. 27 is an exploded view of the internal structure of the circuit protected cell D. On the sealing assembly side of the rechargeable battery 10 (structured as a lithium ion rechargeable battery) are disposed a connection piece 311 joined to the positive electrode input and output terminal (protruding terminal) 25 of this rechargeable battery 10; a spacer 312 that is disposed on the rechargeable battery 10 and provides a seat for the circuit board 309; and a circuit board 309 that constitutes the battery protection circuit and has formed on it the positive terminal 304, the negative terminal 305, and the temperature sensing terminal 306. On the bottom side of the rechargeable battery 10 there is disposed a lead plate 310 whose base 310b is joined to the bottom surface of the rechargeable battery 10 and whose lead 310a extends to the sealing assembly side.

The base 311b of the L-shaped connection piece 311 is joined to the bottom surface of the rechargeable battery 10. The base 310b of the lead plate 310 is joined to the bottom surface of the cell case 26, and the lead 310a extends along the side of the cell case 26 toward the sealing assembly.

Figure 28A:
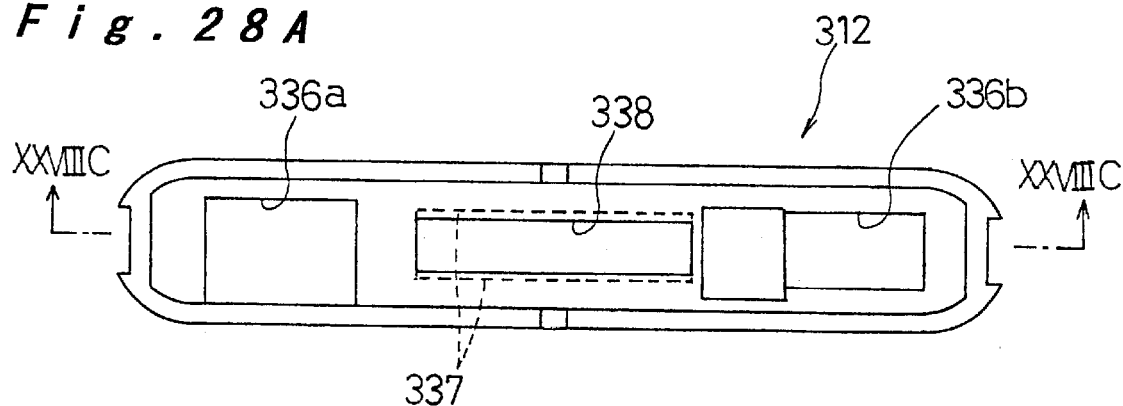
FIG. 28A is a plan view of the structure on the top side of the spacer.
Figure 28B:
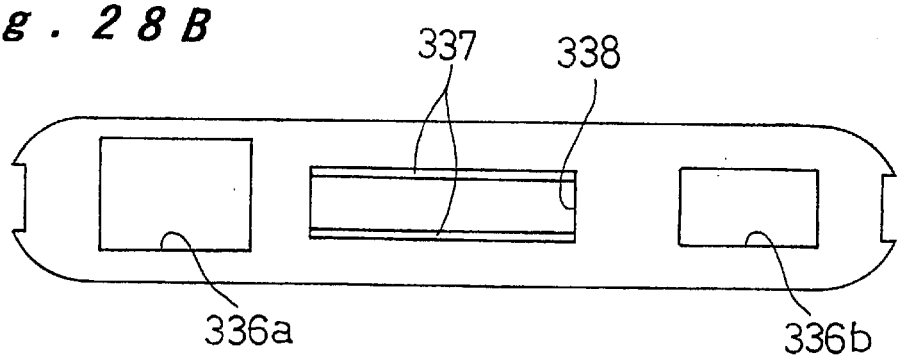
FIG. 28B is a plan view the underside.
Figure 28C:
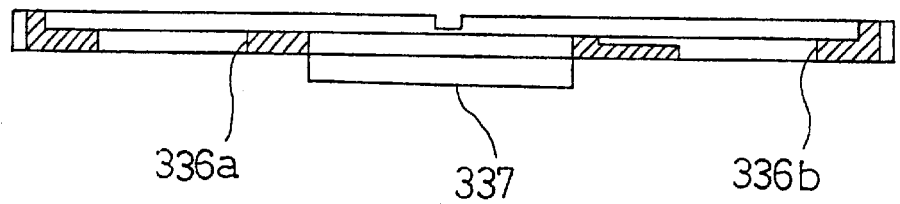
FIG. 28C is a cross section along the XXVIIIC–XXVIIIC line in FIG. 28A.

The spacer 312, which is formed as shown in FIGS. 28A to 28C, is attached on the sealing assembly side of the rechargeable battery 10. As shown in FIG. 28B, a pair of positioning lugs 337 that hit the long side surfaces of the rectangularly formed positive electrode input and output terminal 25 are formed on the underside (the rechargeable battery 10 side) of the spacer 312, and these are disposed on the sealing assembly so as to mate with the positive electrode input and output terminal 25, the result of which is that the spacer 312 is positioned to fit over the rechargeable battery 10.

A connection piece hole 338 between the pair of positioning lugs 337 allows the lead 311a of the connection piece 311 joined to the positive electrode input and output terminal 25 to be passed through to the top surface. The spacer 312 forms a seat insulated from the rechargeable battery 10, and in this seat are formed openings 336a and 336b that accommodate the electronic parts mounted on the sealing assembly side of the circuit board 309. When the circuit board 309 is placed on this seat, the electronic parts mounted on the sealing assembly side fit into the openings 336a and 336b, so the circuit board 309 is stacked up on the rechargeable battery 10 only in a height equal to the thickness of its substrate and the thickness of the spacer 312, which minimizes the increase in height caused by providing the battery protection circuit.

FIGS. 29A and 29B show in see-through fashion the conductor patterns formed on the front and back of the circuit board 309 and the electronic parts mounted thereon, in which the battery protection circuit and input and output circuits shown in FIG. 23 are formed on a substrate. As shown in FIG. 29B, a battery protection circuit in which IC parts 221 and 222 and chip parts 326 are mounted is formed on the back of the circuit board 309. As shown in FIG. 29A, on the front are formed the positive terminal 304, the negative terminal 305, the temperature sensing terminal 306, a connection piece conductor pattern 315 for connecting the connection piece 311, and a lead plate conductor pattern 316 for connecting the lead plate 310. The circuit patterns formed on the two sides are connected by through holes 330 where required. The lead 311a of the connection piece 311 is passed through a lead hole 320 formed in this circuit board 309, and the lead 311a is bent over and soldered on the connection piece conductor pattern 315. The lead 310a of the lead plate 310 is passed into a lead plate notch 329 formed at the end of the circuit board 309, and is bent over and soldered on the lead plate conductor pattern 316. This soldering of the connection piece 311 and the lead plate 310 fixes the circuit board 309 on the spacer 312.

As shown in FIG. 29A, the positive terminal 304 is joined on a positive terminal conductor pattern 304a formed on the front of the circuit board 309, the negative terminal 305 is joined on a negative terminal conductor pattern 305a, and the temperature sensing terminal 306 is joined on a temperature sensing terminal conductor pattern 306a. These terminals have superior electroconductivity, joinability, and corrosion resistance because they are made from a sheet of copper-nickel alloy, a clad material comprising a sheet of copper-nickel alloy and stainless steel, or the like. The terminals need not be joined as sheets, and the various conductor patterns can instead be metal plated and utilized directly as terminals.

Figure 30A:
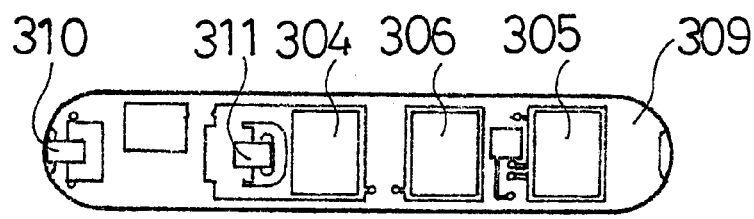
FIG. 30A is a plan view and FIG. 30B is a side view of an intermediate unit.
Figure 30B:
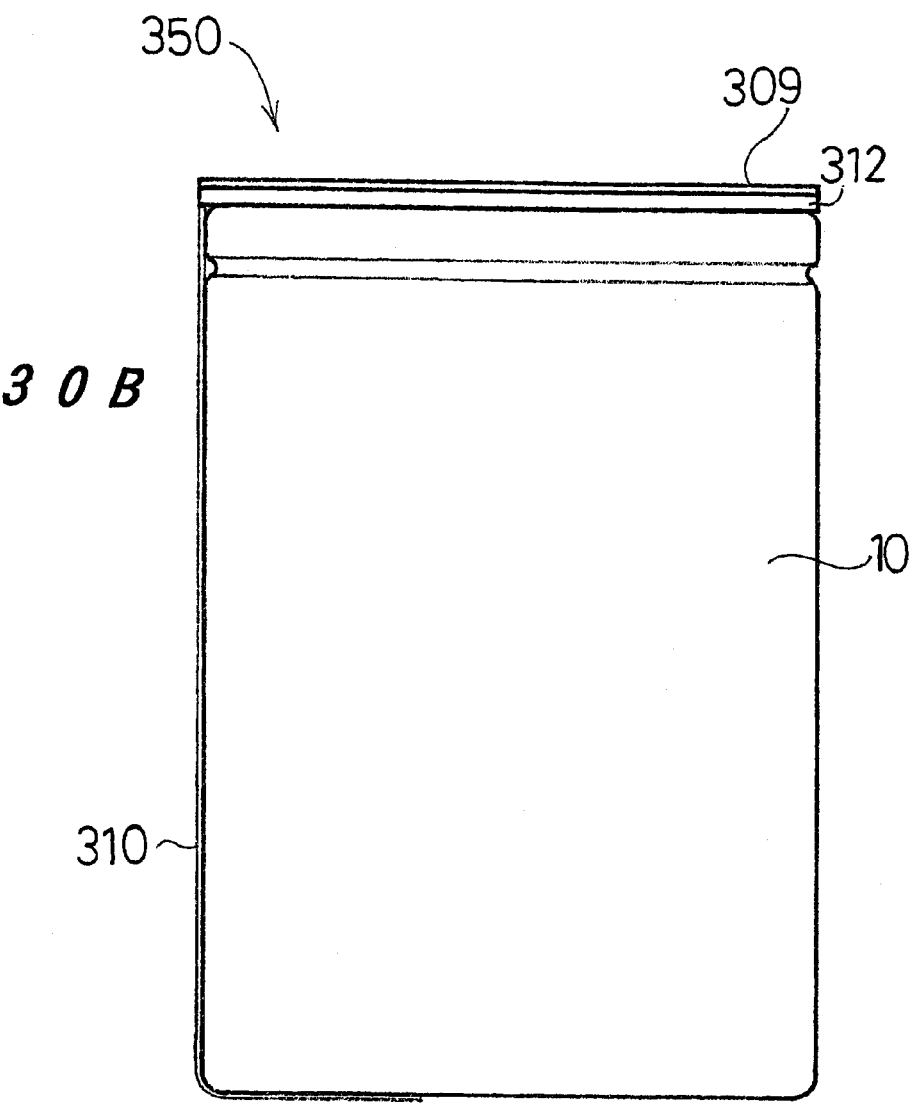

Attaching the circuit board 309 to the rechargeable battery 10 as above forms an intermediate unit 350 in which the rechargeable battery 10 and the circuit board 309 are integrated, as shown in FIG. 30B. This intermediate unit 350 is sealed in an outer case 307 formed as shown in FIGS. 31A to 31D, thereby completing the circuit protected cell D configured as shown in FIG. 26.

Figure 31A:
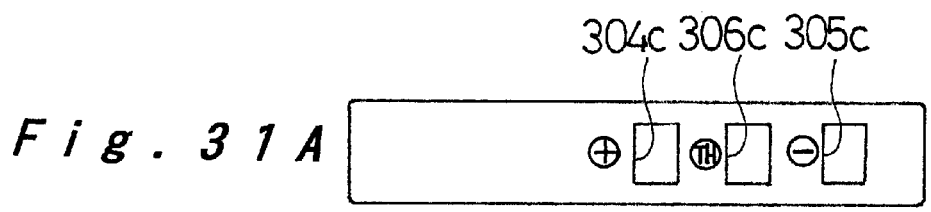
FIG. 31A is a plan view.
Figure 31B:
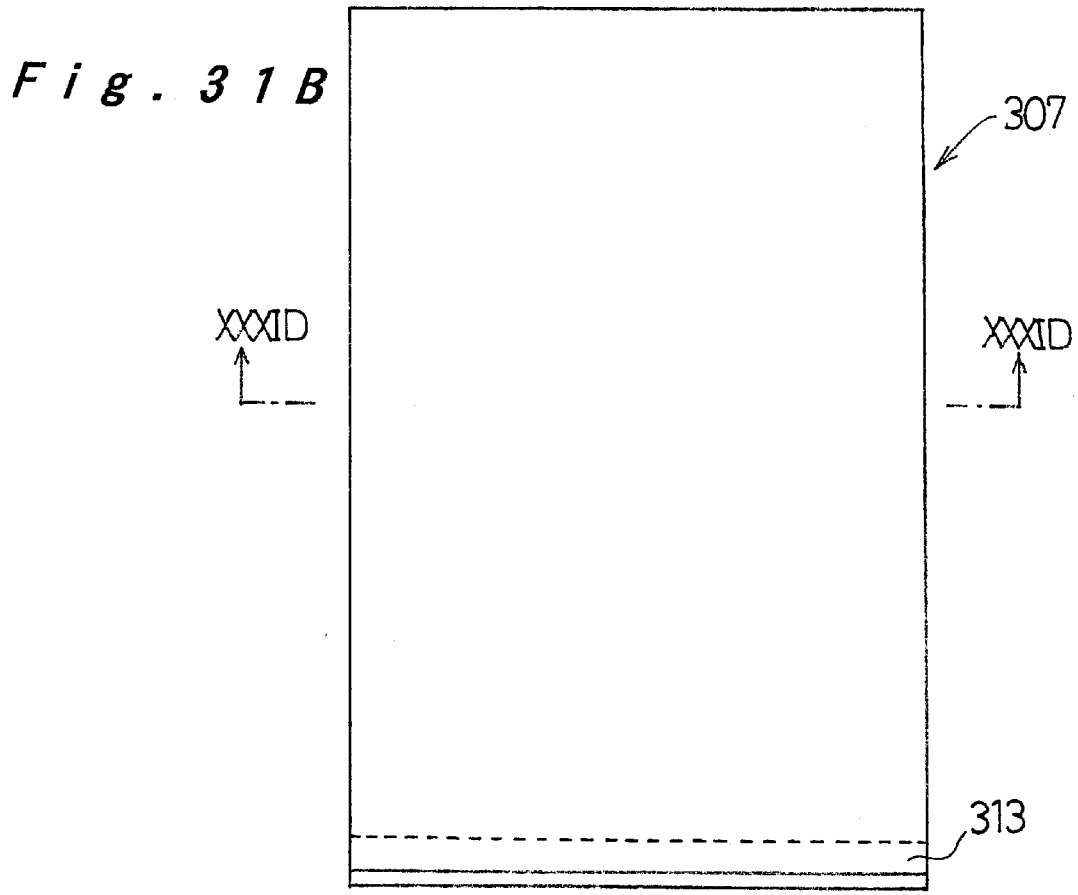
FIG. 31B is a side view.
Figure 31C:
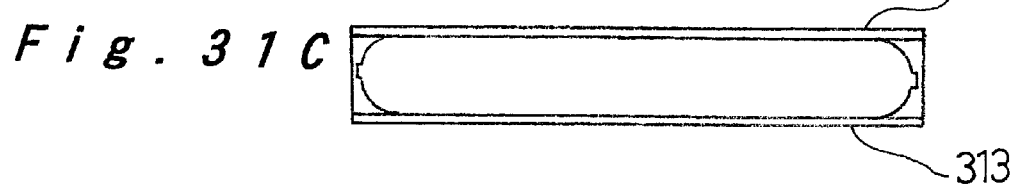
FIG. 31C is a plan view of the open end.
Figure 31D:
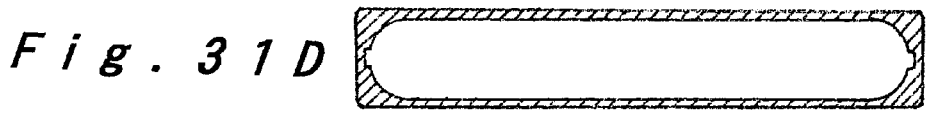
FIG. 31D is a cross section along the XXXID—XXXID line in FIG. 31B, all showing the bottom of the outer case.

In FIGS. 31A to 31D, a positive terminal window 304c provided at a location corresponding to the positive terminal 304 provided to the circuit board 309, a negative terminal window 305c provided at a location corresponding to the negative terminal 305, and a temperature sensing terminal window 306c provided at a location corresponding to the temperature sensing terminal 306 are made in the bottom of the outer case 307 formed in the shape of a bottomed box. Sealing pieces 313 are formed at the open end for closing the open end after the intermediate unit 350 has been put inside. As shown in FIG. 31D, the cross sectional shape of the outer case 307 is such that the inner surface thereof is formed in a substantially oval shape corresponding to the shape of the oval rechargeable battery 10, and the outer shape is rectangular with rounded corners. The shape is modified so that the rechargeable battery 10 with its oval cross section can be fit snugly inside the device.

Figure 32A:
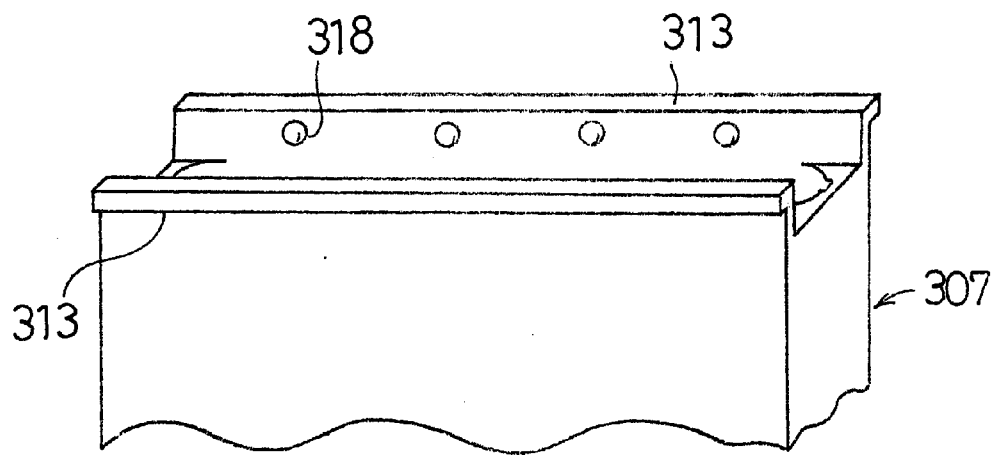
FIG. 32A is an oblique view illustrating the initial state in the sealing of the open end of the outer case.
Figure 32B:
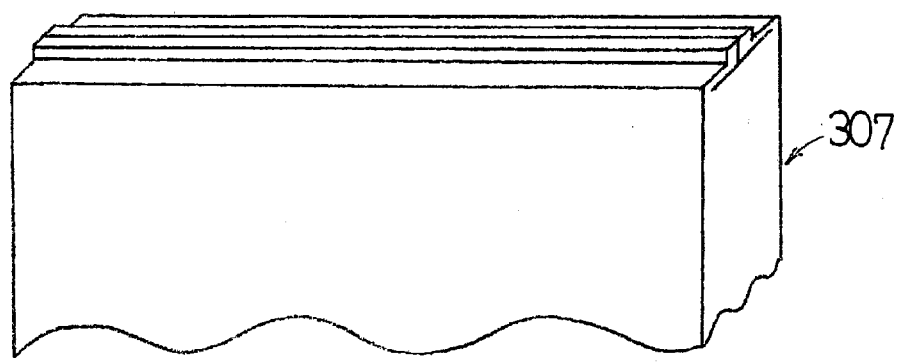
FIG. 32B is an oblique view illustrating a bent state.
Figure 32C:
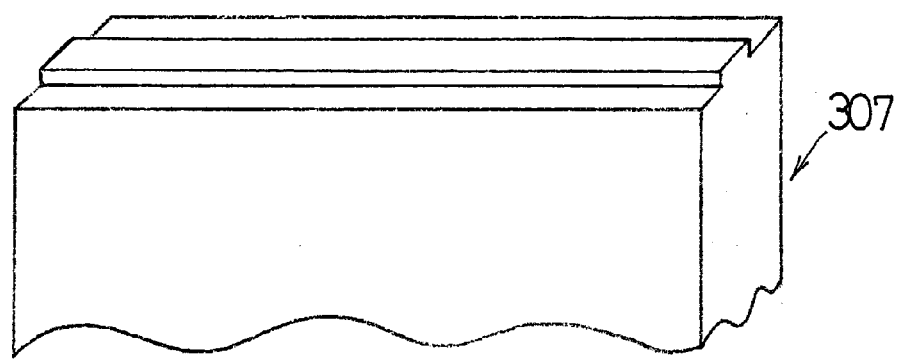
FIG. 32C is an oblique view illustrating a fused state.
Figures 33A, 33B, 33C:
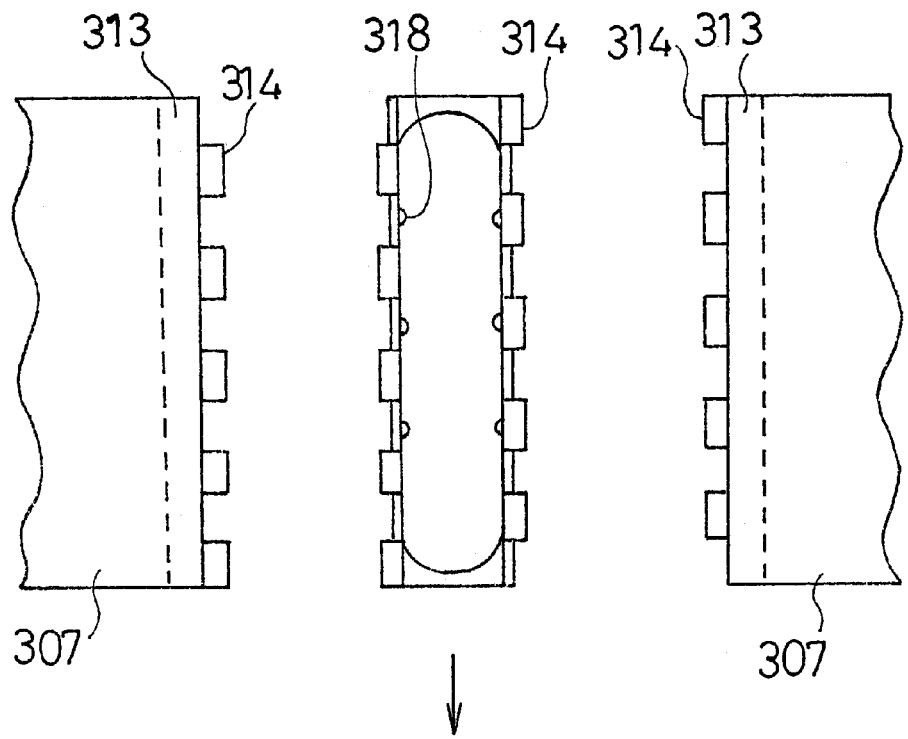
FIG. 33A is a plan view of another embodiment of the sealing pieces.
FIG. 33B is a left side view.
FIG. 33C is a right side view.
Figure 33D:
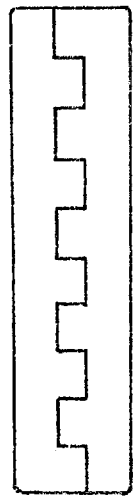
FIG. 33D is a plan view Illustrating a bent state.

The sealing pieces 313 are bent inward by hot pressing, as shown in FIG. 32B, after the intermediate unit 350 has been inserted through the open end of the outer case 307 from the circuit board 309 side thereof in the state shown in FIG. 32A. Then, as shown in FIG. 32C, the opposing sealing pieces 313 are fused/molded by heating and melting, which seals the intermediate unit 350 inside the outer case 307. The ends of the sealing pieces 313 are formed thicker as shown in the figures, which fills in the gap between the opposing sealing pieces 313 when the resin is melted, and ensures that there is enough resin to provide adequate fusion strength.

The sealing pieces 313 can be formed as shown in FIGS. 33A to 33D in a comb shape such that the opposing pieces fit together. The opposing sealing pieces 313 are designed so that there will be a gap between them when they are bent over, and this gap is filled in by melting. To ensure that this gap is filled in and the pieces are securely fused, one or both rows of the comb teeth 314 of the sealing pieces 313 can be formed thicker than the other portions, which provides enough resin to be melted.

This intermediate unit 350 that is housed in the outer case 307 may have variance in its height due to dimensional error in the constituent elements thereof, assembly error, or the like, and this unit may be loose within the outer case 307 if it is smaller than the specified dimensions, but the molten resin can be allowed to penetrate into the interior through the gap between the outer case 307 and the intermediate unit 350, which fills in the gaps that cause looseness and absorbs this dimensional variance. Also, as shown in FIGS. 32A to 32C and FIGS. 33A to 33D, if protrusions 318 are formed on the inside of the sealing pieces 313, any gaps will be filled in if the intermediate unit 350 should be smaller than its specified dimensions, and the height will be reduced if it is larger than its specified dimensions, so variance in the dimensions of the intermediate unit 350 can be absorbed even more effectively.

The open end of the outer case 307 can also be sealed by forming extensions on the four sides around the periphery, and melting these by hot pressing so as to bring the outer case 307 to the specified height and close the open end. With this sealing means, even if there should be variance in the height of the intermediate unit 350 as mentioned above, it can be absorbed in the sealing process. Specifically, if the intermediate unit 350 is taller than the specified height, pressure during hot pressing will be higher, so extra molten resin will flow into the gap between the outer case 307 and the intermediate unit 350, and the open end will be sealed with a thin resin layer. On the other hand, if the intermediate unit 350 is shorter than the specified height, the pressure during hot pressing will be lower, so the amount of molten resin that flows into the gap will be smaller, and the open end will be sealed with a thick resin layer.

As shown in FIG. 26, the circuit protected cell D structured as above allows the battery protection circuit to be housed internally merely by extending the height of the rechargeable battery 10 a small amount. When this circuit protected cell is installed in a device, the reliability of the power source is higher since the cell itself has a battery protection function. Also, the positive terminal 304, the negative terminal 305, and the temperature sensing terminal 306 are disposed asymmetrically to the left and right on the top, which prevents the cell from being installed backwards in the device.

The main application for the flat-shaped rechargeable battery 10 is as a power source for small, portable electronic devices, and increasing the thickness sacrifices the advantages of the flat shape, but with the present structure, a battery protection circuit can be provided without increasing the thickness of the rechargeable battery 10, with the final configuration being not a battery pack, but a smaller, more lightweight rechargeable battery equipped with a battery protection circuit, which helps make compact, portable electronic devices smaller and more lightweight.

The rechargeable battery 10 in this embodiment was a lithium ion rechargeable battery in which the positive electrode input and output terminal 25 is used for the sealing assembly and the cell case 26 for the negative electrode input and output terminal, but it should go without saying that a rechargeable battery in which the negative electrode is on the sealing assembly side and the positive electrode on the cell case side is also acceptable, and that modifications may be made in the connections.

INDUSTRIAL APPLICABILITY

As described above, with the present invention, a battery protection circuit is an integral part of a rechargeable battery so no battery pack structure need be provided, making it seem as though just the battery is being installed in the device. This contributes to reducing the size and weight of devices that use a rechargeable battery as their power source. Also, by increasing the performance of the battery protection circuit, a rechargeable battery can be protected from overcharging, overdischarging, excessive current, and so forth without providing a PTC element or a current cut-off vent, so the function of highly reliable battery protection can be achieved in a more compact size without decreasing the capacity of the rechargeable battery.

What is claimed is:

1. A rechargeable battery pack comprising:
   a rechargeable battery having a first electrode and a second electrode;
   a circuit board disposed at one end on a side of a sealing portion of the rechargeable battery;
   a battery protection circuit for protecting the rechargeable battery from overcharging, the battery protection circuit being arranged on a side of the circuit board which faces the sealing potion of the rechargeable battery;
   a plurality of input and output terminals being arranged on another side of the circuit board; and
   a spacer for supporting the circuit board and keeping the circuit board and the rechargeable battery apart, the spacer including a recess for accommodating electronic parts mounted on the circuit board, wherein
   the first electrode and the second electrode of the rechargeable battery are respectively electrically connected to the plurality of input and output terminals of the circuit board through the battery protection circuit.

2. The rechargeable battery pack according to claim 1, further comprising a cover cap for covering a peripheral part of the rechargeable battery, the cover cap being connected at a specific location of the circuit board.

3. The rechargeable battery according to claim 1, further comprising a pack case for accommodating the rechargeable battery, the spacer, and the circuit board, the pack case having a plurality of openings at a location corresponding to each of the input and output terminals.

4. A rechargeable battery equipped with a battery protection circuit according to claim 1, wherein the plurality of input and output terminals provided on the circuit board are disposed asymmetrically.

5. A rechargeable battery equipped with a battery protection circuit according to claim 1, wherein an IC is provided on a lower side of the circuit board, and a conductor pattern connected to a ground potential is formed on an upper side of the circuit board at least at a location, on the backside of which said IC is disposed.

6. A rechargeable battery equipped with a battery protection circuit according to claim 1, wherein a side peripheral surface of the rechargeable battery is covered with an electrically insulating sheet.

* * * * *